(12) United States Patent
Levert et al.

(10) Patent No.: US 12,101,699 B2
(45) Date of Patent: Sep. 24, 2024

(54) SECURITY ECOSYSTEM, DEVICE AND METHOD FOR COMMUNICATING WITH COMMUNICATION DEVICES BASED ON WORKFLOW INTERACTIONS

(71) Applicant: MOTOROLA SOLUTIONS, INC., Chicago, IL (US)

(72) Inventors: Chantal Levert, Vancouver (CA); Ewelina Sobon, Cracow (PL); Kenneth W. Douros, Chicago, IL (US); Chia Ying Lee, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 269 days.

(21) Appl. No.: 17/504,671

(22) Filed: Oct. 19, 2021

(65) Prior Publication Data

US 2023/0122732 A1    Apr. 20, 2023

(51) Int. Cl.
| | |
|---|---|
| H04W 4/33 | (2018.01) |
| H04W 4/02 | (2018.01) |
| H04W 4/029 | (2018.01) |
| H04W 4/38 | (2018.01) |
| H04W 24/10 | (2009.01) |

(52) U.S. Cl.
CPC ............ *H04W 4/33* (2018.02); *H04W 4/023* (2013.01); *H04W 4/029* (2018.02); *H04W 4/38* (2018.02); *H04W 24/10* (2013.01)

(58) Field of Classification Search
None
See application file for complete search history.

(56) References Cited

U.S. PATENT DOCUMENTS

| | | | |
|---|---|---|---|
| 10,863,317 B2 | 12/2020 | South et al. | |
| 2007/0044539 A1 | 3/2007 | Sabol et al. | |
| 2008/0278579 A1* | 11/2008 | Donovan | H04N 7/18 348/143 |

FOREIGN PATENT DOCUMENTS

| | | |
|---|---|---|
| EP | 3552069 A1 | 10/2019 |
| WO | WO-2018111938 A1 | 6/2018 |

* cited by examiner

*Primary Examiner* — Adolf Dsouza
(74) *Attorney, Agent, or Firm* — PERRY + CURRIER, INC.

(57) ABSTRACT

A device monitors execution of a safety workflow, the safety workflow comprising one or more triggers and one or more responsive actions. The device provides, at a display screen, an indication of the safety workflow and respective visual indications of: a physical sensor that generated sensor data of a trigger of the safety workflow; and a communication device associated with a responsive action to the trigger. The device detects, via an input device, an interaction with one or more of the respective visual indications to interact with one or more of the physical sensor and the communication device. Based on the interaction, the device one or more of: retrieves the sensor data; initiates communication with the communication device; and sends the sensor data to the communication device.

19 Claims, 16 Drawing Sheets

SECURITY ECOSYSTEM, DEVICE AND METHOD FOR COMMUNICATING WITH COMMUNICATION DEVICES BASED ON WORKFLOW INTERACTIONS

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system may have to be configured to provide the notifications to the radios and the video security system may have to be configured to provide the notifications to the radios. Thus, both the access control system and the video security system may need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem may be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
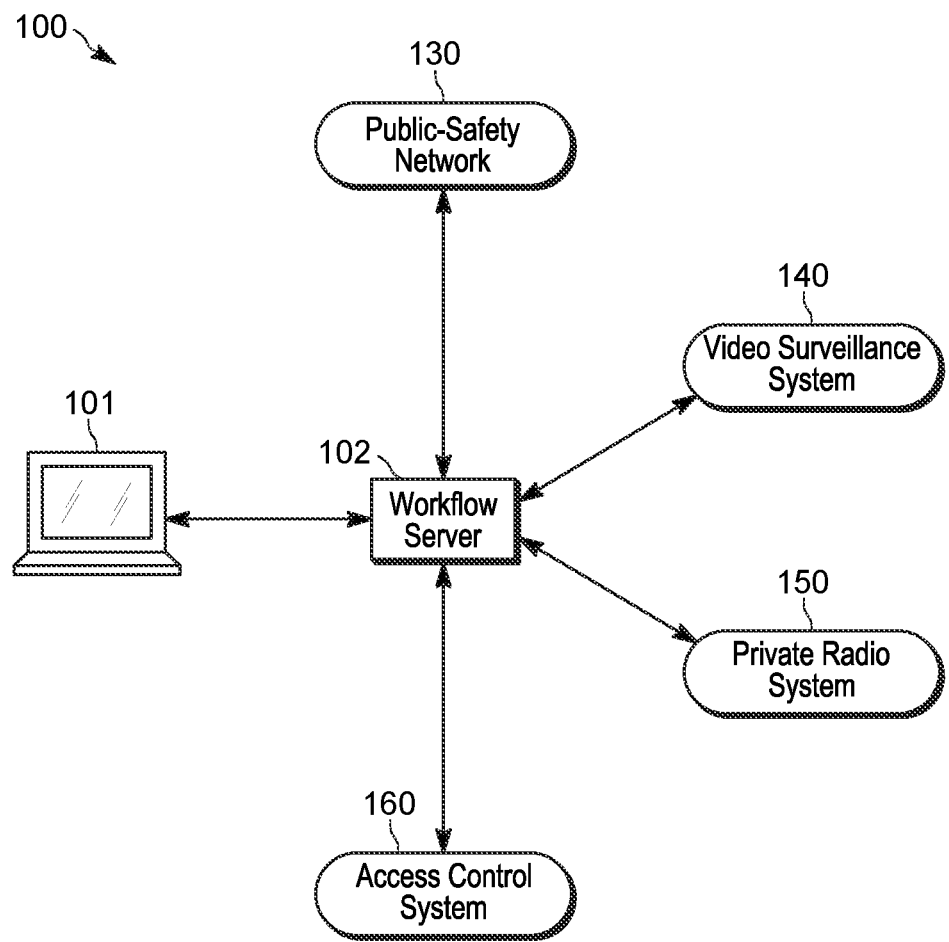
FIG. 1 depicts a security ecosystem capable of configuring and automating workflows, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a system, method, and apparatus for implementing workflows across multiple differing systems and devices is provided herein. During operation, a computing device, such as a workflow server, may monitor one or more triggers that occur in the differing systems and devices based on sensor data generated by, and received from one or more sensors, and, in response, implement one or more actions that may include communicating with one or more communication devices across the differing systems and devices, for example to dispatch security personnel associated with the one or more communication devices to locations at which the sensor data was collected that lead to the triggers. However, it may be challenging to communicate to the one or more communication devices the sensor data that lead to the one or more triggers and/or to change and/or control the safety workflows. Thus, there exists a need for an improved technical system, device, and system for communicating with communication devices based on workflow interactions.

Hence, provided herein is a computing device, for example in the form a workflow server interacting with a workstation, which monitors execution of a safety workflow and/or a plurality of safety workflows. A safety workflow is understood to include an association between a trigger, which occurs when certain conditions are met as determined using sensor data from a physical sensor, and an action, which occurs in response to the trigger and which may include at least an electronic interaction and/or communication with a communication device. One example trigger may comprise determining that a given door is open (e.g. and/or has been open for a given time period) and a responsive action may comprise communicating with a given communication device to dispatch security personnel operating the communication device to the location of the open door.

The computing device further provides, at a display screen (e.g. of the workstation), an indication of a safety work flow and respective visual indications of a physical sensor that generated sensor data of a trigger of the safety workflow and a communication device associated with a responsive action to the trigger. An input device may be used to detect an interaction with one or more of the respective visual indications to one or more of retrieve the sensor data, communicate with the communication device, and send the sensor data to the communication device.

An aspect of the specification provides a method comprising: monitoring, at a computing device, execution of a safety workflow, the safety workflow comprising one or more triggers and one or more responsive actions; providing, via the computing device, at a display screen, an indication of the safety workflow and respective visual indications of: a physical sensor that generated sensor data of a trigger of the safety workflow; and a communication device associated with a responsive action to the trigger; detecting, via the computing device and an input device, an interaction with one or more of the respective visual indications to interact with one or more of the physical sensor and the communication device; and based on the interaction, one or more of: retrieving the sensor data; initiating communication with the communication device; and sending the sensor data to the communication device.

Another aspect of the specification provides a device comprising: a network interface; and a processor configured to: monitor execution of a safety workflow, the safety workflow comprising one or more triggers and one or more responsive actions; provide, at a display screen, an indication of the safety workflow and respective visual indications of: a physical sensor that generated sensor data of a trigger of the safety workflow; and a communication device associated with a responsive action to the trigger; detect, via an input device, an interaction with one or more of the respective visual indications to interact with one or more of the physical sensor and the communication device; and based on the interaction, one or more of: retrieving, via the network interface, the sensor data; initiating, via the network interface, communication with the communication device; and sending, via the network interface, the sensor data to the communication device.

Each of the above-mentioned aspects will be discussed in more detail below, starting with example system and device architectures of the system in which the embodiments may be practiced, followed by an illustration of processing blocks for achieving an improved security ecosystem, device and method for communicating with communication devices based on workflow interactions.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Turning now to the drawings, wherein like numerals designate like components, FIG. 1 illustrates a security ecosystem 100 capable of configuring and automating workflows across multiple systems. The security ecosystem 100 is interchangeably referred to hereafter as the system 100. Furthermore, workflows as referred to herein may alternatively be referred as security workflows as workflows as referred to herein may be used to implement security-based action and/or security base processes.

The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

As shown, the security ecosystem 100 comprises a public-safety network 130, a video surveillance system 140, a private radio system 150, and an access control system 160. A workflow server 102 is coupled to each system 130, 140, 150, and 160. The workstation 101 is shown coupled to the workflow server 102, and is utilized to configure the workflow server 102 with workflows, for example as generated by a user. It should be noted that although the components in FIG. 1 are shown geographically separated, these components can exist within a same geographic area, such as, but not limited to a school, a hospital, an airport, a sporting event, a stadium, a factory, a warehouse and/or any other suitable location and/or building and the like. It should also be noted that although only networks and systems 130, 140, 150, 160 are shown in FIG. 1, many more networks and/or systems may be included in the security ecosystem 100 and/or any suitable number of networks and/or systems may be included in the security ecosystem 100.

The workstation 101 may comprise a computer configured to execute Motorola Solution™'s Orchestrate™ and Ally™ dispatch and incident management software. As will be discussed in more detail below, the workstation 101 is configured to present a user with a plurality of triggers capable of being detected by the network and systems 130, 140, 150, 160 as well as present the user with a plurality of actions capable of being executed by the network and systems 130, 140, 150, 160. The user will be able to generate workflows and upload these workflows to the workflow server 102 based on the presented triggers and actions. While only one workstation 101, the system 100 may comprise a plurality of workstations 101.

The workflow server 102 may comprise a server running Motorola Solution™'s Command Central™ software suite comprising the Orchestrate™ platform. While the workflow server 102 is depicted as one device, the workflow server 102 may be implemented as one or more computing devices, one or more servers, one or more cloud computing devices, and the like, and/or the functionality of the workflow server 102 may be geographically distributed.

The workflow server 102 is configured to receive workflows generated by the workstation 101 (and/or a plurality of workstations 101) and implement the workflows. Furthermore, the workflow server 102 may implement (e.g., concurrently, and the like) different workflows associated with different workstations. Particularly, the workflows are implemented by analyzing events detected by the network and systems 130, 140, 150, 160 and executing appropriate triggers. In a particular example, a user may generate a workflow on the workstation 101 that has a trigger comprising the video surveillance system 140 detecting a loitering event, and has an action comprising notifying radios within the public-safety network 130. When this workflow is uploaded to the workflow server 102, the workflow server 102 will notify the radios of any loitering event detected by the video surveillance system 140.

The public-safety network 130 is configured to detect various triggers and report the detected triggers to the workflow server 102. The public-safety network 130 is also configured to receive action commands from the workflow server 102 and execute the actions. In some examples, the public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from the workflow server 102.

The video surveillance system 140 is configured to detect various triggers and report the detected triggers to the workflow server 102. The video surveillance system 140 is also configured to receive action commands from the workflow server 102 and execute the actions. In one example, the video surveillance system 140 comprises a plurality of video cameras that may be configured to automatically change their field-of-views over time. The video surveillance system 140 is configured with a recognition engine/video analysis engine (VAE) that comprises a software engine that analyzes any video captured by the cameras using, for example, any suitable process which may include, but is not limited to machine learning algorithms, convolutional neural networks (CNNs), and the like. Using the VAE, the video surveillance system 140 is capable of "watching" video to detect any triggers and report the detected triggers to the workflow server 102. These triggers may include, but are not limited to, appearance searches and unusual Activity Detection (e.g., loitering). In a similar manner, the video surveillance system 140 is configured to execute action commands received from the workflow server 102. In some examples, the video surveillance system 140 comprises an Avigilon™ Control Center (ACC) server having Motorola Solution™'s Access Control Management (ACM)™ software suite.

The private radio system 150 may comprise a private enterprise radio system that is configured to detect various triggers and report the detected triggers to the workflow server 102. The private radio system 150 is also configured to receive action commands from the workflow server 102 and execute the actions. In some examples, the private radio system 150 comprises a MOTOTRBO™ communication system having radio devices that operate in the Citizens Broadband Radio Service (CBRS) spectrum and combines broadband data with voice communications.

The access control system 160 comprises an Internet-of-Things (IoT) network which may serve to connect every-day devices to the Internet. Devices such as cars, kitchen appliances, medical devices, sensors, doors, windows, HVAC (heating, ventilation, and air conditioning) systems, drones, . . . , etc. can all be connected through the IoT network of the access control system 160. Indeed, any suitable device that can be powered may be connected to the internet to control its functionality. The access control system 160 generally allows objects to be sensed or controlled remotely across existing network infrastructure. For example, the access control system 160 may be configured to provide access control to various doors and windows. In particular, the access control system 160 is configured to detect various triggers (e.g., door opened/closed) and report the detected triggers to the workflow server 102. The access control system 160 is also configured to receive action commands from the workflow server 102 and execute the action received from the workflow server 102. The action commands may take the form of instructions to lock, open, and/or close a door or window.

As is evident, the security ecosystem 100 allows an administrator using the workstation 101 to generate rule-based, automated workflows between technologies to enhance efficiency, and improve response times, effectiveness, and overall safety. The security ecosystem 100 generally has the capability to detect triggers across a number of devices within network and systems 130, 140, 150, 160 and quickly take actions by automatically executing the proper procedure (i.e., executing the appropriate action once a trigger is detected).

The network and systems 130, 140, 150, 160 are next described in further detail.

Figure 2:
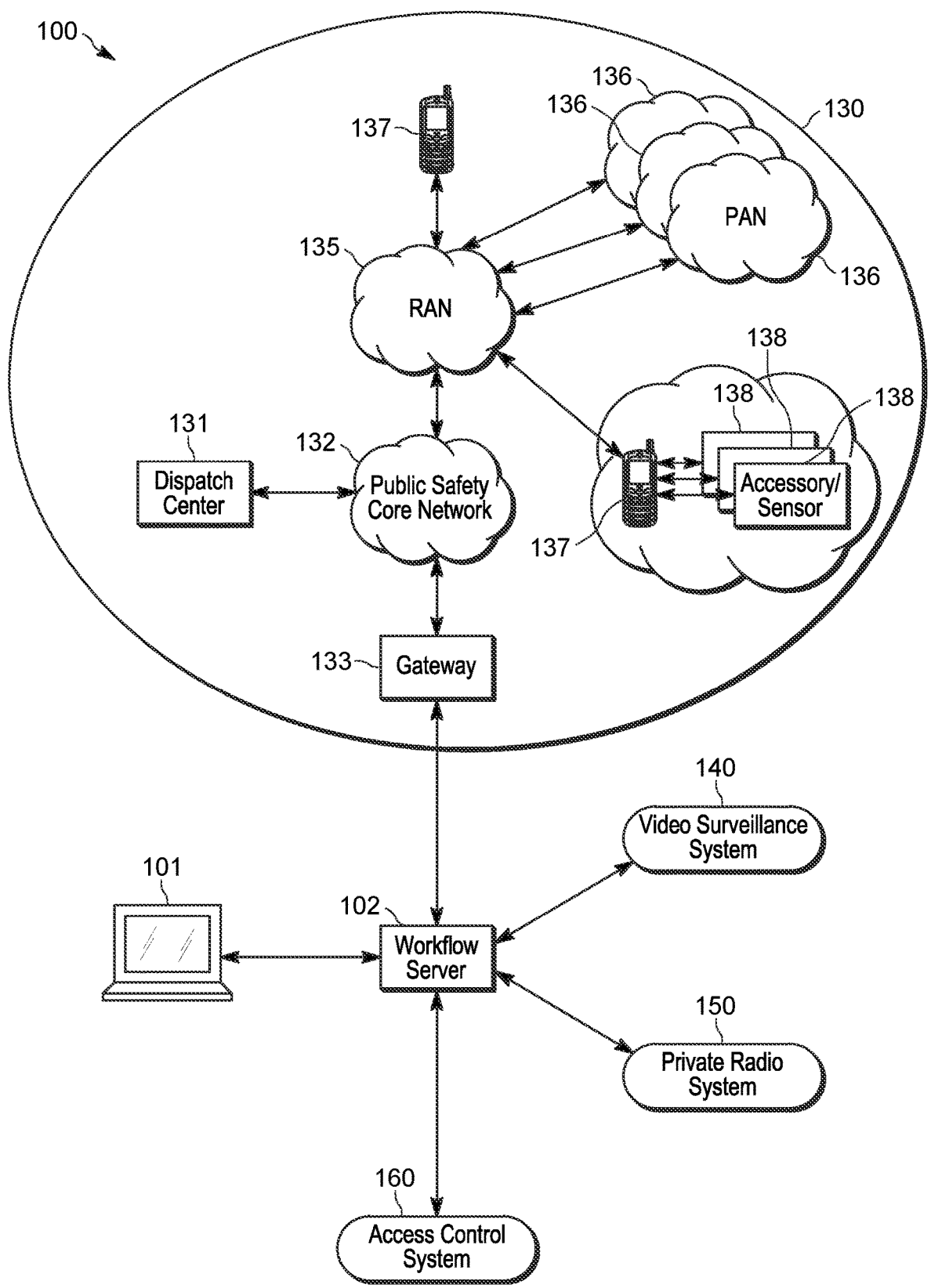
FIG. 2 depicts a security ecosystem capable of configuring and automating workflows, in accordance with some examples.

FIG. 2 illustrates a security ecosystem capable of configuring and automating workflows. In particular, FIG. 2 shows the security ecosystem 100 with an expanded view of the public-safety network 130. As shown, the public-safety network 130 comprises a dispatch center 131, a public-safety core network 132, a gateway 133, a radio access network (RAN) 135, a plurality of personal-area networks (PANs) 136, and at least one radio 137, such as a public-safety radio and the like (however the radios 137 may include, but are not limited to, any suitable combination of communication devices, such as mobile phones, two-way radios, and the like). As shown, each PAN 136 comprises a radio 137 acting as a hub to smart devices/accessories/sensor 138 (interchangeably referred to hereafter as the sensors and/or a sensor 138). Hereafter the radios 137 may be interchangeably referred to as a communication device 137.

The gateway 133 may comprise an Avigilon™ Control Center running Avigilon's Access Control Management software. The gateway 133 is configured to run any suitable Application Program Interface (API) to provide communications between the public-safety core network 132 and the workflow server 102.

A public safety officer (not shown in FIG. 2) may be equipped with sensors 138 that determine various physical and environmental conditions surrounding the public-safety officer. These conditions may be reported back to, for example, the dispatch center 131 or the workflow server 102 so an appropriate action may be taken. For example, police officers may have a sensor 138 (e.g. in the form of a gun-draw sensor) that determines when a gun is drawn. Upon detecting that an officer has drawn their gun, a notification may be sent back to the dispatch operator and/or the workflow server 102 so that, for example, other officers in the area may be notified of the situation.

It is envisioned that the public-safety officer may have an array of these sensors 138 available to the officer at the beginning of a shift. The officer may select and pull sensors 138 off a shelf, and form a personal-area network (PAN) 136 with the devices that may accompany the officer on their shift. For example, the officer may pull a gun-draw sensor, a body-worn camera, a wireless microphone, a smart watch, a police radio, smart handcuffs, a man-down sensor, a bio-sensor, and the like. All sensors 138 pulled by the officer may be configured to form a PAN 136 by associating (pairing) with each other and communicating wirelessly among the devices. At least one device may be configured with a digital assistant. In some examples, a PAN 136 comprises more than two sensors 138, so that many sensors 138 may be connected via a PAN 136 simultaneously.

A method called bonding may be used for recognizing specific sensors 138 and thus enabling control over which accessories are allowed to connect to each other when forming a PAN 136. Once bonded, accessories then can establish a connection without user intervention. A bond may be generated through a process called "pairing". The pairing process may be triggered by a specific request by the user to generate a bond from a user via a user interface on the accessories. Thus, as shown, public-safety network 130 incorporates PANs 136 generated as described above. In some examples, radios 137 and sensors 138 form a PAN 136, with communication links between sensors 138 and radios 137 taking place utilizing a short-range communication system protocol such as a Bluetooth communication system protocol. In this particular example, a PAN 136 may be associated with a single officer. Thus, FIG. 2 illustrates multiple PANs 136 associated with multiple officers (not shown).

The RAN 135 may include various RAN elements such as base stations, base station controllers (BSCs), routers, switches, and the like, arranged, connected, and programmed to provide wireless service to user equipment (e.g., the radios 137, and the like) in a manner known to those of skill in the relevant art. The RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other examples, the RAN 135 may implement a Long Term Evolution (LTE), LTE-Advance, or 5G protocol including multimedia broadcast multicast services (MBMS) or single site point-to-multipoint (SC-PTM) (including, but not limited to open mobile alliance (OMA) push to talk (PTT) over cellular (OMA-PoC)), a voice over IP (VoIP), an LTE Direct or LTE Device to Device, or a PTT over IP (PoIP) application may be implemented. In still further examples, the RAN 135 may implement a Wi-Fi protocol for example operating in accordance with an IEEE 802.11 standard (e.g., 802.11a, 802.11b, 802.11g) or a WiMAX protocol for example operating in accordance with an IEEE 802.16 standard.

The public-safety core network 132 may include one or more packet-switched networks and/or one or more circuit-switched networks, and in general provides one or more public-safety agencies with any suitable computing and communication needs, transmitting any suitable public-safety-related data and communications.

For narrowband LMR wireless systems, the public-safety core network 132 may operate in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some examples, group IDs (identifiers) may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (such as at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) c based on user input, and the switching and/or radio network may track group membership and route new group calls according to the current group membership.

The radios 137 generally serve as PAN main devices, and may be any suitable computing and communication device configured to engage in wireless communication with the RAN 135 over the air interface as is known to those in the relevant art. Moreover, one or more radios 137 are further configured to engage in wired and/or wireless communication with one or more local sensor 138 via a local communication link. The radios 137 may be configured to determine when to forward information received from PA sensors 138 to, for example, a dispatch center or the workflow server 102.

Some examples of sensors 138 follow:

In some examples, a sensor 138 may comprise a sensor-enabled holster that maintains and/or provides state information regarding a weapon or other item normally disposed within the user's sensor-enabled holster. The sensor-enabled holster may detect a change in state (presence to absence) and/or an action (removal) relative to the weapon normally disposed within the sensor-enabled holster. The detected change in state and/or action may be reported to a radio 137 via its short-range transceiver, which may forward the state change to the dispatch center 131 or the workflow server 102. In some examples, the sensor-enabled holster may also detect whether the first responder's hand is resting on the weapon even if it has not yet been removed from the holster and provide such information to portable radio 137.

In some examples, a sensor 138 may comprise a biometric sensor (e.g., a biometric wristband) for tracking an activity of the user or a health status of a user, and may include one or more movement sensors (such as an accelerometer, magnetometer, and/or gyroscope) that may periodically or intermittently provide to a radio 137 indications of orientation, direction, steps, acceleration, and/or speed, and indications of health such as one or more of a captured heart rate, a captured breathing rate, and a captured body temperature of the user, for example accompanying other information. This information may be reported to a radio 137 which may forward the information to the dispatch center 131 and/or the workflow server 102.

In some examples, a sensor 138 may comprise an accelerometer to measure acceleration. Single and multi-axis models are available to detect magnitude and direction of the acceleration as a vector quantity, and may be used to sense orientation, acceleration, vibration shock, and falling. The accelerometer may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to a radio 137 which may forward the information to dispatch center 131 and/or the workflow server 102.

In some examples, a sensor 138 may comprise a heart rate sensor that uses electrical contacts with the skin to monitor an electrocardiography (EKG) signal of its wearer, or may use infrared light and imaging device to optically detect a pulse rate of its wearer, among other possibilities. This information may be reported to a radio 137 which may forward the information to the dispatch center 131 and/or the workflow server 102.

In some examples, a sensor 138 may comprise a breathing rate sensor 138 to monitor breathing rate. The breathing rate sensor may include use of a differential capacitive circuits or capacitive transducers to measure chest displacement and thus breathing rates. In other examples, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to a radio 137 which may forward the information to the dispatch center 131 and/or the workflow server 102.

The dispatch center 131 may comprise, and/or may be part of, a computer-aided-dispatch center (sometimes referred to as an emergency-call center or public-safety answering point), that may be manned by an operator providing any suitable dispatch operations. For example, the dispatch center 131 may comprise a graphical user interface that provides the dispatch operator any suitable information about public-safety officers. As discussed above, some of this information originates from sensors 138 providing information to radios 137, which forwards the information to the RAN 135 and ultimately to the dispatch center 131.

In a similar manner, information about public-safety officers may be provided to the workflow server 102. This information may originate from the sensors 138 providing information to the radios 137, which forwards the information to the RAN 135 and ultimately to the workflow server 102 via the public-safety core network 132 and the gateway 133. For example, a sensor 138 comprising a gun-draw sensor may send an indication to the workflow server 102 that a gun has been drawn. This may serve as a "trigger" for the workflow server 102 to initiate a particular "action", for example, notifying surrounding officers (for example on a particular talkgroup) by having their radios 137 provide an alarm indicating the triggering event. Thus, the workflow server 102 may provide instructions to any sensor 138 or radio 137 by sending an "action" to a sensor 138 in response to a trigger being received.

Figure 3:
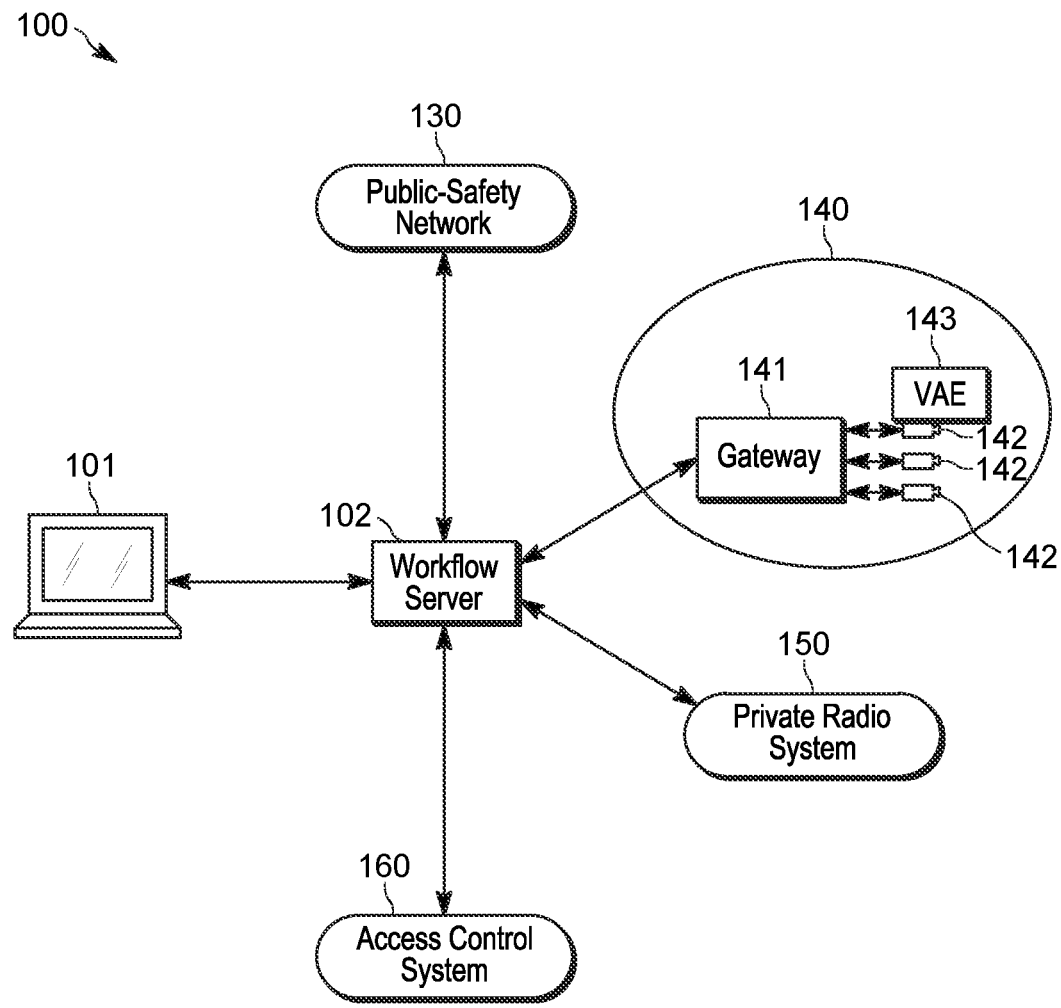
FIG. 3 depicts a security ecosystem capable of configuring and automating workflows, in accordance with some examples.

FIG. 3 illustrates a security ecosystem capable of configuring and automating workflows. In particular, FIG. 3 shows the security ecosystem 100 with an expanded view of the video surveillance system 140. As shown, the video surveillance system 140 comprises a plurality of image sensors and/or cameras 142 and the gateway 141.

Cameras 142 may be fixed or mobile, and may have pan/tilt/zoom (PTZ) capabilities to change their field-of-view. The cameras 142 are generally understood to comprise image sensors and hence may also be referred to as images sensors. Cameras 142 may also comprise circuitry configured to serve as a VAE 143 (only one of which is depicted in FIG. 3, though it is understood that any camera 142 may comprise circuitry configured to serve as a VAE 143). The VAE 143 comprises a software engine that analyzes analog and/or digital video. The VAE 143 is generally configured to "watch" video and detect pre-selected objects such as license plates, people, faces, automobiles. The VAE 143 may also be configured to detect certain actions of individuals, such as fighting, loitering, crimes being committed, . . . , etc. and/or actions of objects, such as speeding, a car driving on a pedestrian walkway, a car moving against the flow of traffic, . . . , etc.; however the VAE 143 may be configured to detect any suitable action. The VAE 143 may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires. Combinations of object detectors may be utilized to detect combinations of objects, such as automobiles on fire, and the like, automobiles that are not on fire, and the like.

The gateway 141 may comprise an Avigilon™ Control Center running Avigilon's Access Control Management software. The gateway 141 is configured to run any suitable Application Program Interface (API) to provide communications between any cameras 142 and the workflow server 102.

Figure 4:
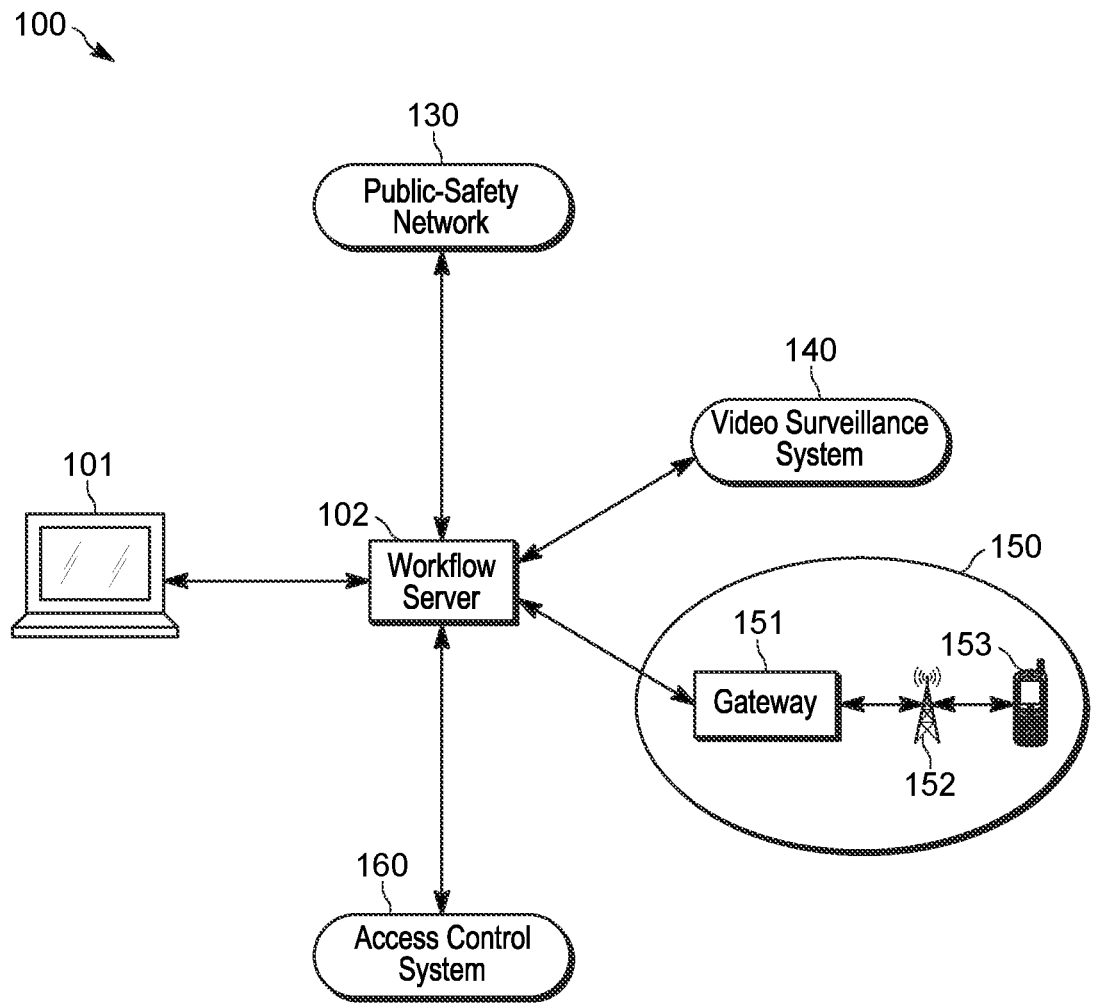
FIG. 4 depicts a security ecosystem capable of configuring and automating workflows, in accordance with some examples.

FIG. 4 illustrates a security ecosystem capable of configuring and automating workflows. In particular, FIG. 4 shows the security ecosystem 100 with an expanded view of the private radio system 150. As shown, the private radio system 150 comprises the gateway 151, system infrastructure 152, and at least one radio 153. Communications from the radio 153 to the workflow server 102 passes through the system infrastructure 152, the gateway 151, and ultimately to the workflow server 102. Hereafter the radios 153 may be interchangeably referred to as a communication device 153.

The gateway 151 may comprise an Avigilon™ Control Center running Avigilon's Access Control Management software. The gateway 151 is configured to run any suitable Application Program Interface (API) to provide communications between any of the system infrastructure 152 and the workflow server 102.

The system infrastructure 152 comprises any suitable equipment to provide wireless communications to and from the radio 153. The system infrastructure 152 may comprise Motorola Solution™'s MOTOTRBO™ equipment, such as an SLR Series Repeater (e.g., SLR 1000, SLR 5000, or SLR8000 repeater) configured to provide two-way radio service to radio 153.

Although only a single radio 153 is shown in FIG. 4, any suitable number of radios 153 may be present within the private radio system 150. Each radio 153 may comprise a MOTOTRBO™ two-way radio (such as a Motorola Solution™ XPR 5000 Series radio) with digital technology providing integrated voice and data communication.

Figure 5:
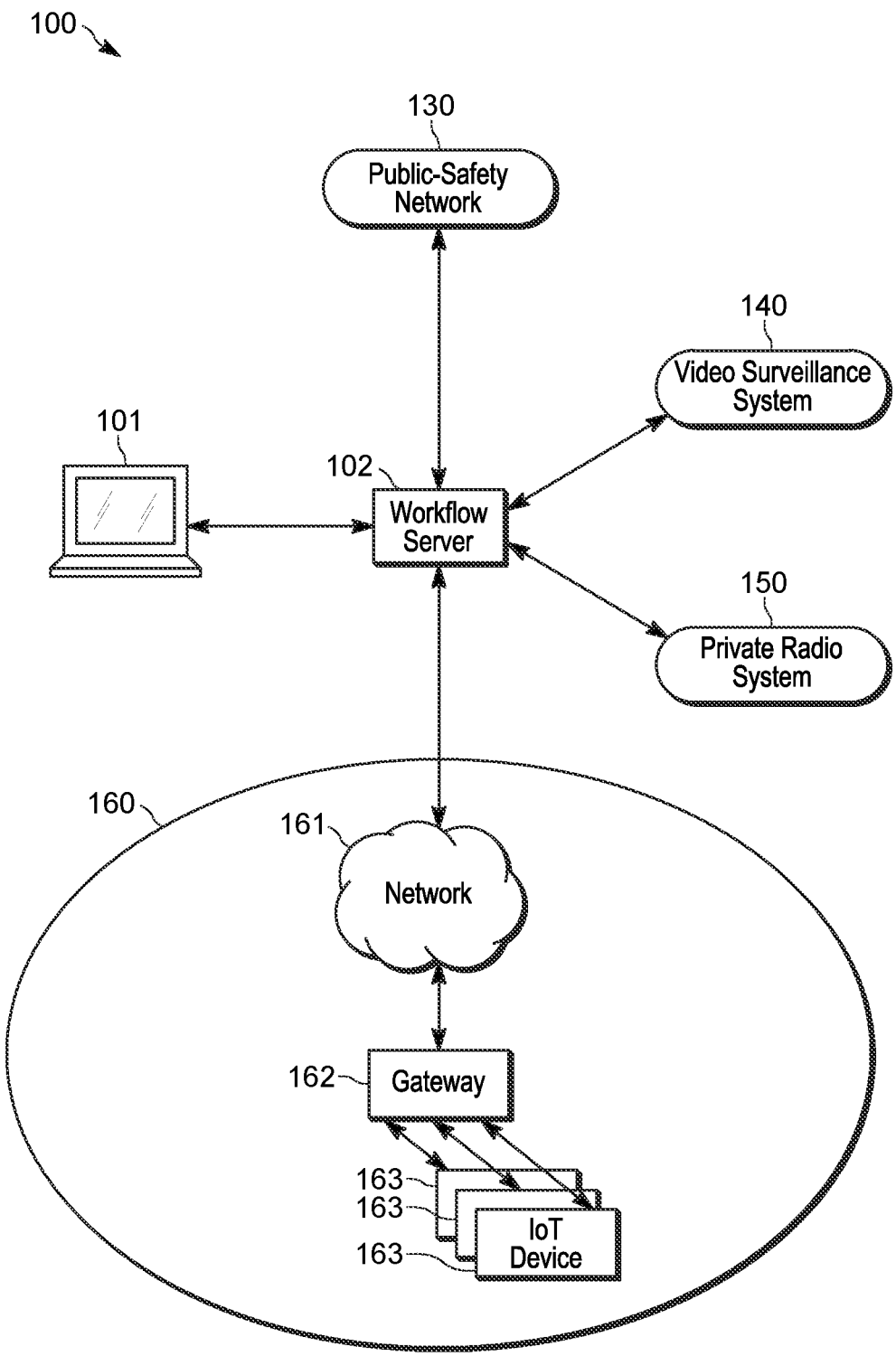
FIG. 5 depicts a security ecosystem capable of configuring and automating workflows, in accordance with some examples.

FIG. 5 illustrates a security ecosystem capable of configuring and automating workflows. In particular, FIG. 5 shows the security ecosystem 100 with an expanded view of the access control system 160. As shown, the access control system 160 comprises a gateway 162 and a plurality of IoT devices 163 coupled to the gateway 162. Data passed from the workflow server 102 to the IoT devices 163 passes through the network 161, the gateway 162 and ultimately to the IoT device 163. Conversely, data passed from the IoT devices 163 to the workflow server 102 passes through the gateway 162, the network 161, and ultimately to the workflow server 102.

The IoT devices 163 may comprise devices that control objects, doors, windows, sensors, and the like. Any particular suitable communication protocol (e.g. an IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

The gateway 162 may comprise an Avigilon™ Control Center running Avigilon's Access Control Management software. The gateway 162 is configured to run any suitable Application Program Interface (API) to provide communications between any IoT device 163 and the workflow server 102.

The network 161 may comprise one of many networks used to transmit data, including, but not limited to, a network employing one of the following protocols: conventional, or trunked LMR standard or protocol such as ETSIDMR, a 25 standard defined by the APCO, TETRA, or other LMR radio protocols or standards; LTE protocol, LTE-Advance protocol, or 5G protocol including multimedia broadcast MBMS or SC-PTM protocol (including, but not limited to an OMA-PTT OMA-PoC), a VoIP protocol, an LTE Direct or LTE Device to Device protocol, or a PoIP protocol, a Wi-Fi protocol for example operating in accordance with an IEEE 802.11 standard (e.g., 802.11a, 802.11b, 802.11g) or a WiMAX protocol for example operating in accordance with an IEEE 802.16 standard.

Figure 6:
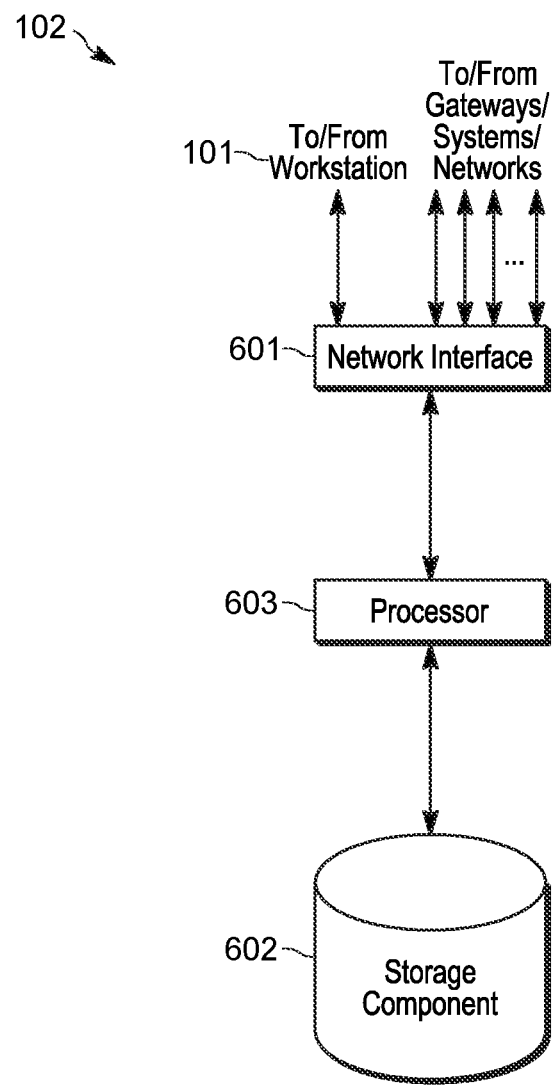
FIG. 6 is a block diagram of a workflow server of FIG. 1, in accordance with some examples.

FIG. 6 is a block diagram of the workflow server 102 of FIG. 1. As shown, the workflow server 102 comprises a network interface 601, a storage component 602 (e.g. as depicted a database, but may comprise any suitable memory and/or storage component), and a processor 603. The processor 603 is understood to include any suitable logic circuitry.

The network interface 601 includes any suitable components for communicating with other suitable components of the system 100, in particular, as depicted, to the workstation 101, the gateways 133, 141, 151, 162 of the networks and systems 130, 140, 150, 160, and the like. Components of the network interface 601 include any suitable processing, modulating, and transceiver components that are operable in accordance with any one or more standard or proprietary wireless interfaces, wherein some of the functionality of the processing, modulating, and transceiver components may be performed by means of the processor 603 through programmed logic such as software applications or firmware stored on the storage component 602 (e.g., standard random access memory) or through hardware. The network interface 601 may include any suitable wired or wireless network interfaces, including, but not limited to, Ethernet interfaces, T1 interfaces, USB interfaces, IEEE 802.11b interfaces, IEEE 802.11g interfaces, and the like.

The processor 603 may comprise a digital signal processor (DSP), general purpose microprocessor, a programmable logic device, or application specific integrated circuit (ASIC), and the like, and is generally configured to receive triggers from various gateways, systems, and networks (e.g. of the system 100). The processor 603 is further configured to execute (or cause to be executed) a particular action for a trigger that is received. More particularly, when the processor 603 receives a trigger from any network or system, the processor 603 may access the storage component 602 to determine an action for the particular trigger. Once an action has been determined, the processor 603 will execute the action, or cause the action to be executed. In order to perform the above, the processor 603 may execute an instruction set/software (e.g., Motorola Solution™'s Command Central™ software suite comprising the Orchestrate™ platform) which may be stored at the storage component 602.

The storage component 602 may comprise standard memory (such as Random Access Memory (RAM), Read Only Memory (ROM), and the like) and generally serves to store associations between triggers and actions. Examples of various triggers and actions are illustrated in in Table 1, below.

TABLE 1

Associations Between Triggers and Actions.

| Trigger | Action |
| --- | --- |
| Warehouse back door opened | Pan camera "342" to point at door |
| Man-Down sensor activated for Officer Smith | Notify dispatch center via emergency text message |
| ALPR for delivery truck | Open back gate |
| . . . etc. | . . . etc. |

Figure 7:
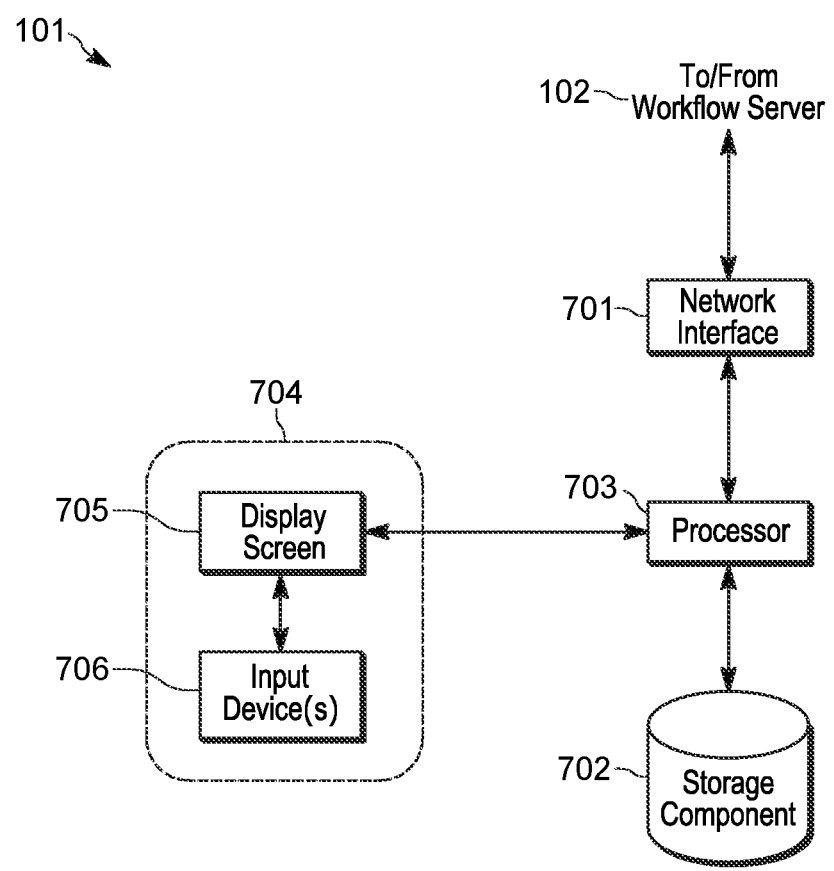
FIG. 7 is a block diagram of a workstation of FIG. 1 utilized to generate a workflow, in accordance with some examples.

FIG. 7 is a block diagram of the workstation 101 of FIG. 1 utilized to generate a workflow. As shown, the workstation 101 comprises a network interface 701, a storage component 702, a processor 703, and a graphical user interface (GUI) 704.

The network interface 701 includes any suitable components for communicating with other suitable components of the system 100, in particular, as depicted, to the workflow server 102. Components of the network interface 701 include any suitable processing, modulating, and transceiver components that are operable in accordance with any one or more standard or proprietary wireless interfaces, wherein some of the functionality of the processing, modulating, and transceiver components may be performed by means of the processor 703 through programmed logic such as software applications or firmware stored on the storage component 702 (e.g., standard random access memory) or through hardware. The network interface 701 may include any suitable wired or wireless network interfaces, including, but not limited to, Ethernet interfaces, T1 interfaces, USB interfaces, IEEE 802.11b interfaces, IEEE 802.11g interfaces, and the like.

Processor 703 may comprise a DSP), general purpose microprocessor, a programmable logic device, or an ASIC and may be configured to execute Motorola Solution™'s Orchestrate™ and Ally™ dispatch and incident management software which may be stored at the storage component 702. The execution of such software may allow users of the GUI 704 to generate workflows (i.e., actions and their associated responses) by receiving user inputs at the GUI 704 that define various triggers and their associated actions, which will ultimately be uploaded to the workflow server 102 and stored in the storage component 602.

The storage component 702 may comprise standard memory (such as RAM, ROM, and the like) and serves to store instructions as software. Particularly, Motorola Solution™'s Orchestrate™ and Ally™ dispatch and incident management software may be stored at the storage component 702.

The GUI 704 generally provides a man/machine interface for receiving an input from a user and displaying information. For example, the GUI 704 may provide a mechanism of conveying (e.g., displaying) user-generated workflows. Thus, the GUI 704 may also provide a mechanism for a user to input workflows into a displayed form. In order to provide the above features (and additional features), the GUI 704 may include any combination of a display screen 705 (e.g., a computer screen, which may include a touch screen, a monitor, and the like) and any suitable combination of one or more input devices 706 (e.g. a keyboard and mouse combination).

Figure 8:
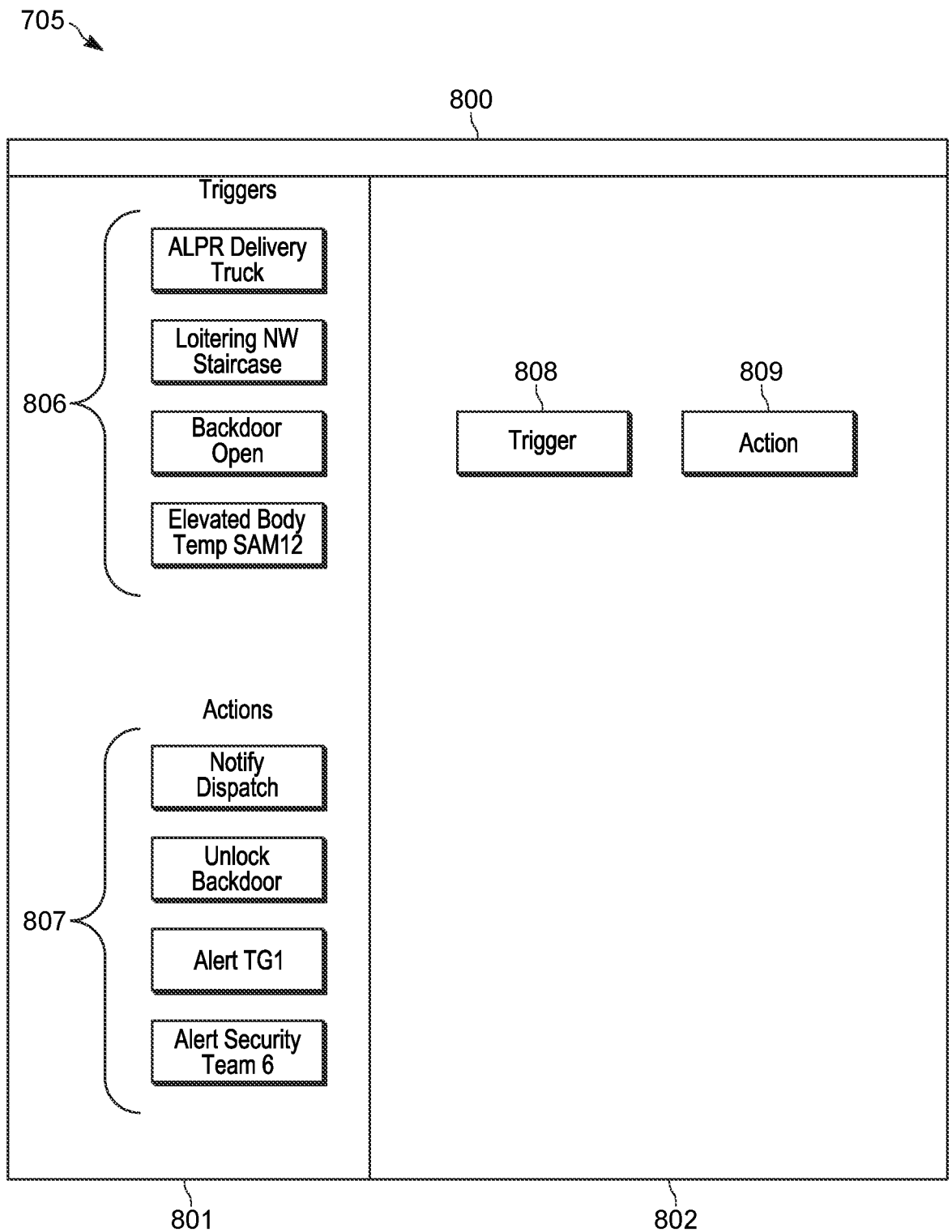
FIG. 8 depicts a dashboard for generating a workflow, in accordance with some examples.

FIG. 8 illustrates the generation of a workflow. More particularly, FIG. 8 illustrates a dashboard 800 rendered at the display screen 705 utilized for the generation of workflows. As depicted, the dashboard 800 consists of the following main components:

a selection panel 801 (e.g. on a left-hand side), which lists available triggers 806 and actions 807;

a workspace 802, which comprises a large area in the middle of the dashboard 800 used to generate workflows that define the connections between triggers and actions. Each workflow in the workspace is displayed as a separate field 808, 809 with an outline and a title. As shown in FIG. 8, two fields 808, 809 are shown, one labeled "trigger" and another labeled "action".

While the dashboard 800 is depicted in a particular configuration, the dashboard 800 may have any suitable configuration; for example, the selection panel 801 may be on a right-hand side, a top side or a bottom side relative to the workspace 802.

The triggers 806 represent the events originating from various sensors, software, and devices within the security ecosystem 100. The actions 807 represent the possible responses to the triggers that may be implemented via any suitable various sensors, software, and devices within the security ecosystem 100, including, but not limited to, the radios 137, 153.

After a workflow is deployed (i.e., uploaded to the workflow server 102), its actions activate when the triggers occur. Triggers and actions appear on the workspace after they are dragged and dropped from the triggers 806 and actions 807 tabs respectively. For example, as depicted, the field 808 represents a trigger 806 that may have been dragged and dropped to the workspace 802 and the field 809 represents an action 807 that may have been dragged and dropped to the workspace 802. Connecting the triggers and actions on the workspace (as described below) will generate a workflow.

The triggers 806 and the actions 807 are generally stored at the storage component 702 and represent integrations across multiple products. In other words, triggers 806 and the actions 807 comprise triggers and actions for any suitable components available in the security ecosystem 100. This includes cameras, sensors, IoT devices, radios, . . . , etc. As administrators add additional technology pieces to the security ecosystem 100, those pieces may be automatically made available for workflow generation as discussed herein.

In order to associate a trigger 806 with an action 807 in the workspace 802, a user selects a trigger 806 from all possible triggers 806, and drags and drops it onto workspace 802, as represented by the field 808. The user then selects an action 807 for the trigger 806 that is in the workspace 802, and drags and drops it onto workspace 802. Once in the workspace 802, a trigger 806 may be referred to as a trigger node, and an action 807 may be referred to as an action node. In order to associate the trigger 806 with the action 807, they are connected. To connect a trigger node to an action node, a user may click an end of the trigger node (e.g. that is closest to the action node) and drag a line to the action node, or vice versa. However, any suitable process for connecting nodes is within the scope of the present specification.

Figure 9:
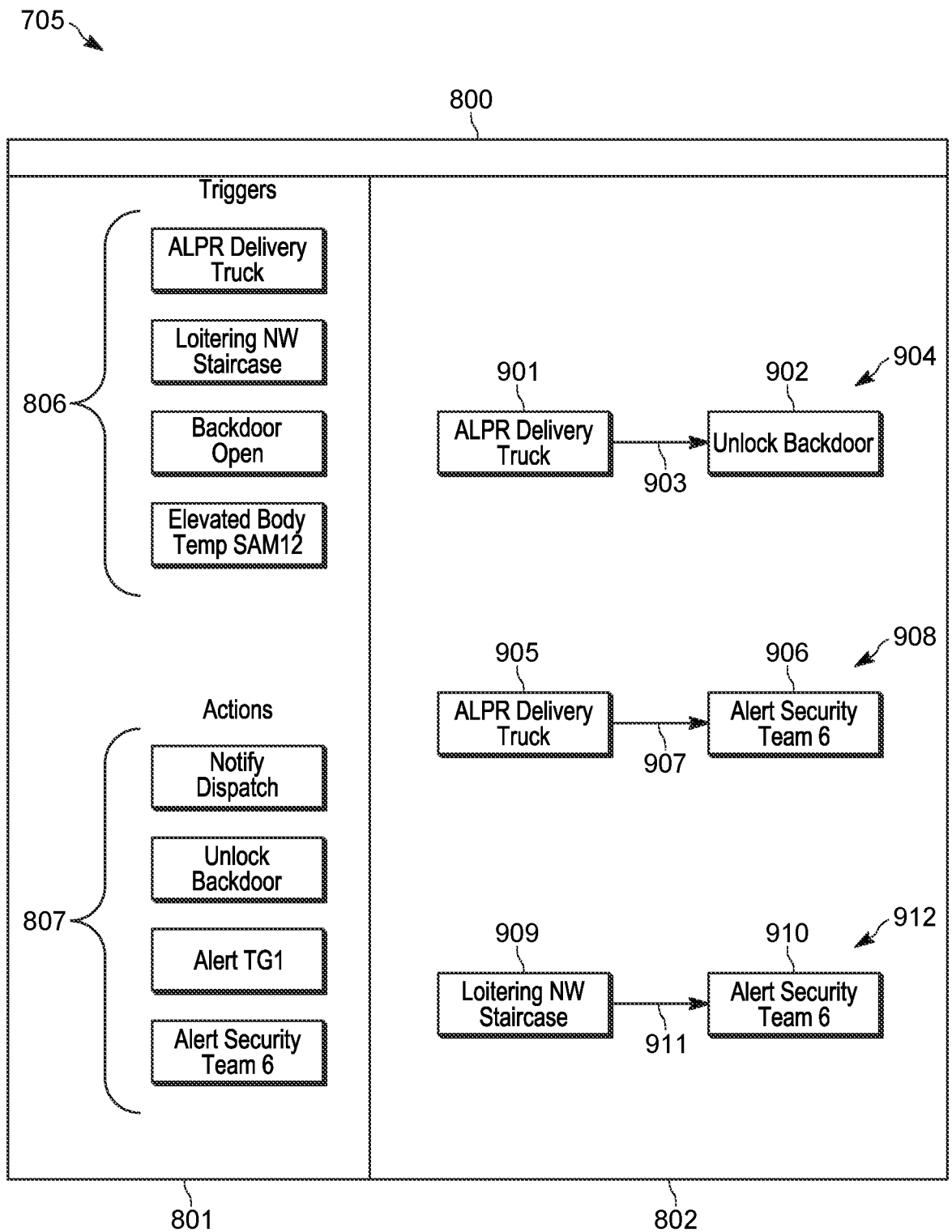
FIG. 9 depicts the dashboard of FIG. 8 with an example workflow, in accordance with some examples.

As shown in FIG. 9, which depicts the dashboard 800 in use, a trigger "ALPR Delivery Truck" 901 has been associated with an action "Unlock Backdoor" 902 by dragging a line 903 between the two, thereby forming a workflow 904. While only one trigger 901 and one action 902 is depicted in the workflow 904, the workflow 904 may comprise any suitable number of triggers (e.g. a trigger group) and any suitable numbers of associated action (e.g. an action group). Hence, if any of the triggers within a trigger group occurs, the workflow 904 is initiated causing the action to be executed. For example, as depicted ALPR stands for automated license plate reader, which may be one of the IoT devices 163; as such, according to the workflow 904, when automated license plate reader of the access control system 160 "reads" a license plate of a delivery truck (e.g. the trigger 901), an associated backdoor (e.g. of a warehouse) is opened; such a backdoor may also comprise one of the IoT devices 163. While note depicted, a memory in the system 100 may also store a list of license plates for which the backdoor is to be opened and the trigger 901 may include comparing a number of the license plate that is read with license plates in such a list, such that the backdoor is opened only when the license plate is on the list.

Furthermore, it is understood that the system 100 may comprise a plurality of IoT devices 163 that are automated license plate readers, and that the trigger 901 may be for a particular automated license plate reader; as such, while not depicted, the actions 807 may include respective "ALPR" actions 807 for other automated license plate reader. Similarly, it is understood that the system 100 may comprise a plurality of IoT devices 163 that are backdoors, and that the action 902 may be for a particular backdoor; as such, while not depicted, the actions 807 may include respective "Unlock Backdoor" actions 807 for other backdoors.

For example, as depicted the triggers 806 include a trigger 806 for detecting loitering at a particular "North West" (e.g. NW) staircase of a particular building (e.g. "Loitering NW Staircase") that may be detected using a VAE 143 of one or more cameras 142 and the like. The triggers 806 further includes a trigger 806 for detecting whether a particular backdoor is open (e.g. "Backdoor Open") that may be detected using a VAE 143 of one or more cameras 142 and/or an open/closed sensor on the backdoor and the like. The triggers 806 further includes a trigger 806 for detecting whether a particular individual, for example a first responder and/or police officer and/or security guard having an identifier "SAM12" has an elevated body temperature (e.g. "Elevated Body Temp SAM12") that may be detected using a biometric sensor of one or more sensors 138 and the like.

For example, as depicted the actions 807 include an action 807 for notifying a first responder and/or police and/or security dispatch (e.g. "Notify Dispatch") such as the dispatch center 131. The actions 807 further includes an action 807 for alerting a particular talkgroup identified by the identifier TG1 and/or Talkgroup #1 (e.g. "Alert TG1") such as a particular talkgroup of the radios 137 (and/or the radios 153). The actions 807 further includes an action 807 for alerting a particular security team identified by the identifier Security Team 6 (e.g. "Alert Security Team 6") which may be associated with a particular group of the radios 137 (and/or the radios 153) and which may, or may not, be associated via a talkgroup.

However, the triggers 806 and actions 807 may include any suitable triggers and actions, which may be dragged and dropped, and the like, into the workspace 802, and associated with each other to generate workflows.

For example, as also shown in FIG. 9, the trigger "ALPR Delivery Truck" 806 may be added to the workspace 802 a second time from the selection panel 801, as a trigger "ALPR Delivery Truck" 905, and associated with a different action "Alert Security Team 6" 906 (e.g. added as an action 807 from the selection panel 801) by dragging a line 907 between the two, thereby forming a workflow 908. Such an example illustrates that a given trigger 806 may be used more than once to generate a workflow 904, 908, in association with different actions 807. Similarly, a given action 807 may be used more than once in the workspace 802 to form workflows with different triggers 806.

Similarly, as also shown in FIG. 9, the trigger "Loitering NW Staircase" 806 may be added to the workspace 802 from the selection panel 801, as a trigger "Loitering NW Staircase" 909, and associated with action "Alert Security Team 6" 910 (e.g. added as an action 807 from the selection panel 801) by dragging a line 911 between the two, thereby forming a workflow 912. Such an example illustrates that a given action 807 may be used more than once to generate a workflow 908, 912, in association with different triggers 806.

Figure 10:
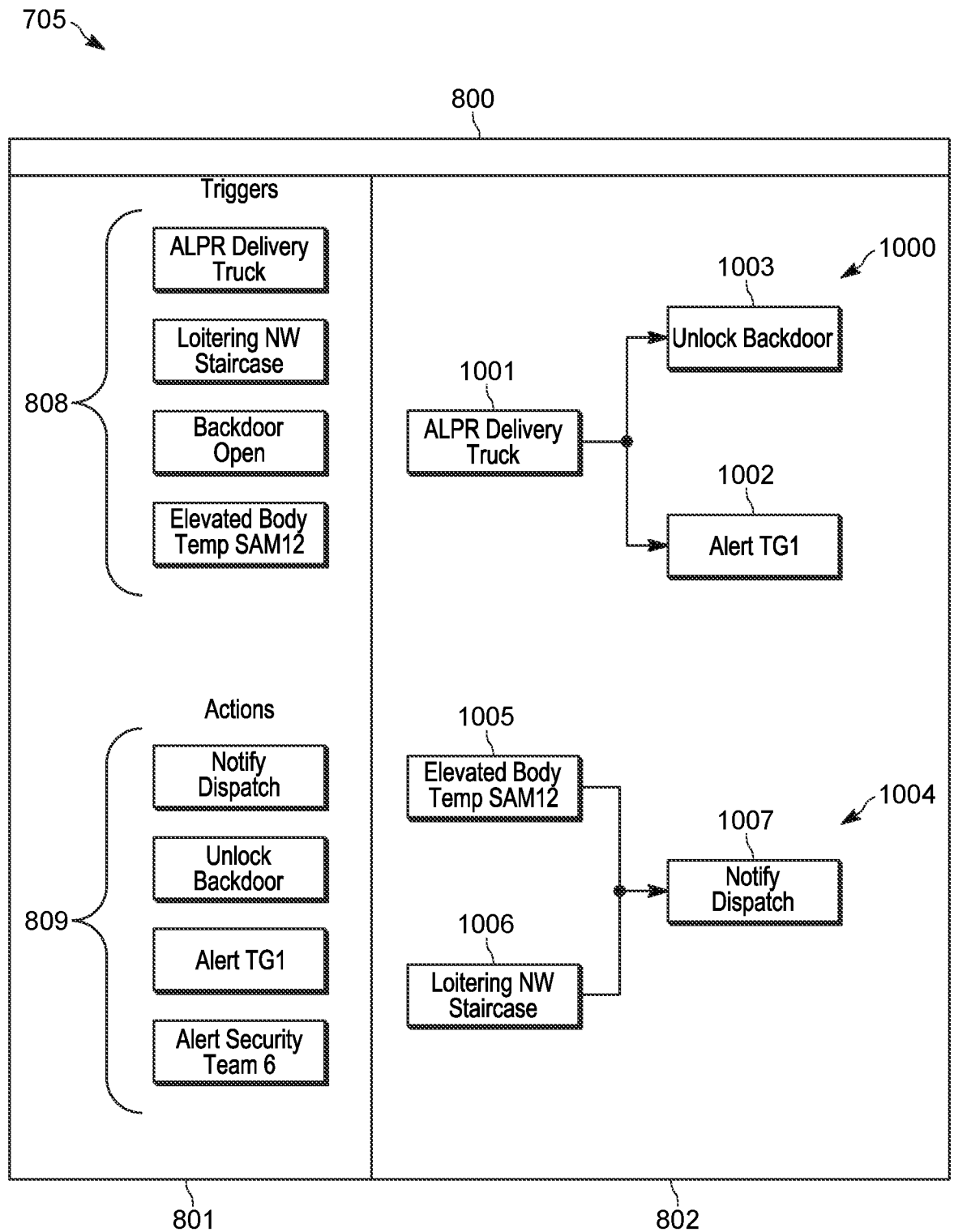
FIG. 10 depicts the dashboard of FIG. 8 with other example workflows, in accordance with some examples.

As illustrated in FIG. 10, a single trigger may be associated with multiple actions in a workflow. Thus, in an illustrated workflow 1000, a trigger 1001 of "ALPR Delivery Truck" may be associated with an action 1003 of "Unlock Back Door" 1003 as well as associated with an action 1002 of "Alert TG 1". When the workflow 1000 is uploaded to the workflow server 102, and the automatic license plate detects a delivery truck, workflow server 102 will cause both the back door to unlock and an alert to be sent on Talkgroup #1.

In a similar manner multiple triggers may be associated with a single action. Thus, in an illustrated workflow 1004, both a trigger 1005 of "Elevated Body Temp SAM 12" and a trigger 1006 of "Loitering NW Staircase" will cause an action 1007 of "Notify Dispatch" 1008. When the workflow 1004 is uploaded to the workflow server 102, the workflow server 102 notifies the dispatch center when either a police officer (and the like) identified by the identifier "SAM 12" has an elevated body temperature (e.g. above a threshold body temperature", or when loitering is detected in the NW staircase.

As mentioned above, it may be challenging to communicate to the one or more communication devices the sensor data that lead to the one or more triggers and/or to change and/or control the safety workflows.

In order to address such a problem, the workflow server 102 may be adapted to: monitor execution of a safety workflow, the safety workflow comprising one or more triggers and one or more responsive actions; provide, at a display screen, an indication of the safety workflow and respective visual indications of: a physical sensor that generated sensor data of a trigger of the safety workflow; and a communication device associated with a responsive action to the trigger; detect, via an input device, an interaction with one or more of the respective visual indications to interact with one or more of the physical sensor and the communication device; and based on the interaction, one or more of: retrieve the sensor data; initiate communication with the communication device; and send the sensor data to the communication device.

Hereafter, workflows may be interchangeably referred to as safety workflows as it is understood that workflows as described herein may be used to implement procedures and/or processes related to safety and/or public safety of persons and/or personnel, for example at a school, a hospital, an airport, a sporting event, a stadium, a factory, a warehouse and/or any other suitable location and/or building and the like. Hereafter, the workflow server 102 may be interchangeably referred to as a computing device (e.g. which may be implemented as one or more computing devices, one or more servers, one or more cloud computing devices, and the like). Hereafter, it is understood that any of the sensors 138, cameras 142, IoT devices 163 comprise physical sensors that may generate sensor data that may be provided to the workflow server 102 to determine whether a trigger has occurred.

Figure 11:
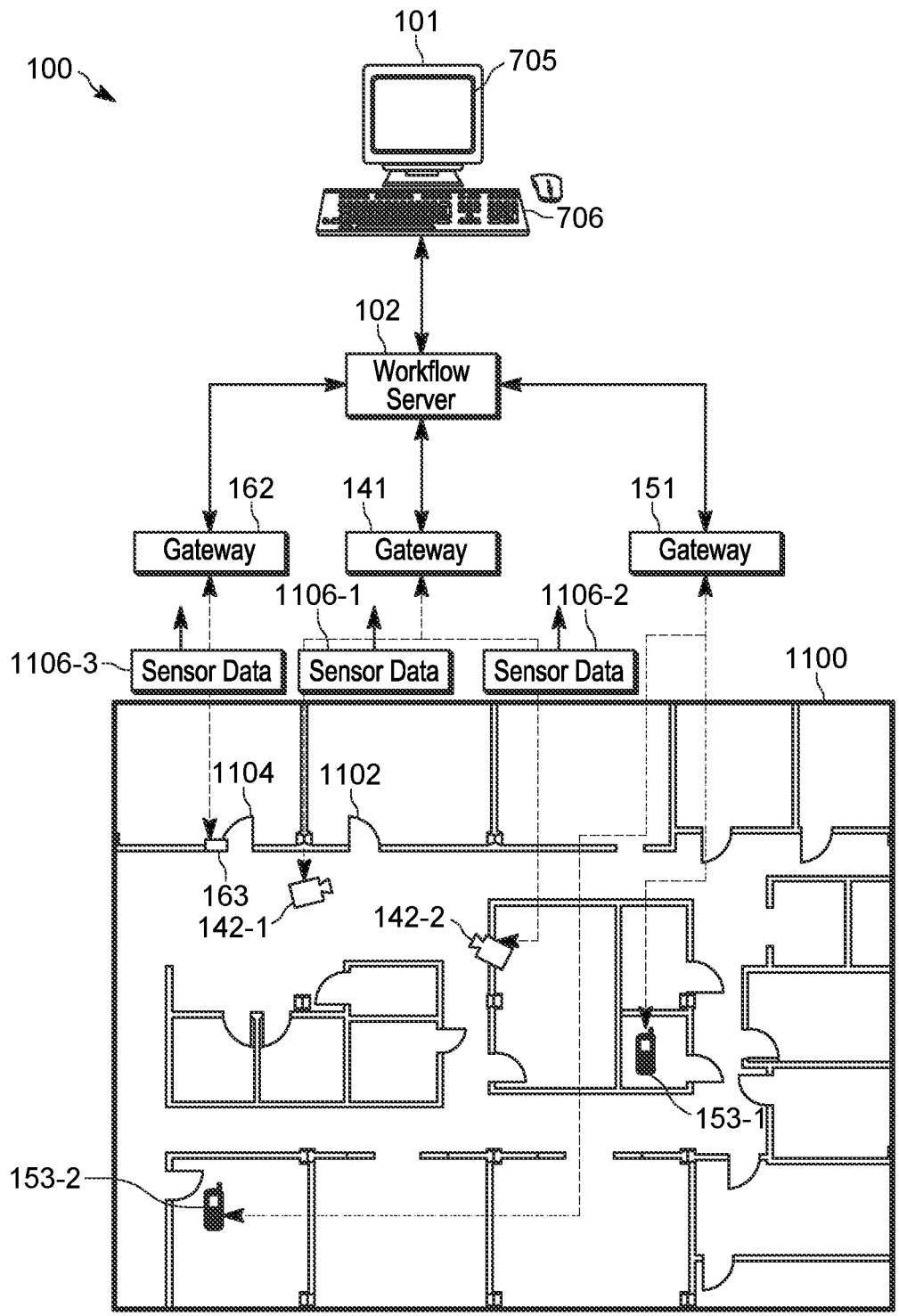
FIG. 11 depicts the system of FIG. 1 as at least partially deployed in a building, in accordance with some examples.

Attention is next directed to FIG. 11 which depicts portions of an example of the system 100, with cameras 142-1, 142-2, communication devices 153-1, 153-2, and an IoT device 163 deployed in a building 1100. In particular, FIG. 11 depicts a top view of a cross-section of a floor of the building 1100 showing physical locations of the cameras 142-1, 142-2, the communication devices 153-1, 153-2, and the IoT device 163.

In particular, a first camera 142-1 is positioned to acquire images of a first door 1102 (e.g. to a room number 4); for example, as depicted, the first door 1102 is in a field-of-view of the first camera 142-1. Similarly, a second camera 142-2 is positioned to acquire images of the first door 1102 and a second door 1104 (e.g. to a room number 5); for example, as depicted, the doors 1102, 1104 are both in a field-of-view of the second camera 142-2. In particular, images from the cameras 142-1, 142-2 may be used to determine whether a given door 1102, 1104 is opened or closed, for example using a respective VAE 143 (not depicted) of the cameras 142-1, 142-2. Such images from the cameras 142-1, 142-2 are understood to comprise sensor data, for example from physical image sensors of the cameras 142-1, 142-2.

Furthermore, the IoT device 163 may comprise an object that controls the second door 1104 to be opened or closed, and/or determine whether the second door 1104 is open or closed; hence, the IoT device 163 may comprise a physical sensor which may be used to determine whether the second door 1104 is opened or closed, for example using sensor data from the IoT device 163.

While not depicted, the communication devices 153-1, 153-2 are understood to be operated by respective security personnel, such as security guards deployed in the building 1100, and the like. However, one or more of the communication devices 153-1, 153-2 may be operated by other types of personnel, such as a janitor, and the like.

Also depicted in FIG. 11 are the workstation 101, with the display screen 705 and the one or more input devices 706 (interchangeably referred to hereafter as the input device 706 and/or the input devices 706), as well as the workflow server 102, and the gateways 141, 151, 162. Furthermore, communication links are shown between the cameras 142 and the gateway 141, the communication devices 153 and the gateway 151, and the IoT device 163 and the gateway 162; such communication links are shown in the form of dashed double-ended arrows to better distinguish them from the walls and rooms of the building 1100. While other components of the system 100 are not depicted, it is understood that any suitable components, as previously described, may be present. For example, while components of the public-safety network 130 are not depicted, they may nonetheless be present.

As depicted, it is understood that the workflow server 102 may be implementing and/or monitoring security workflows associated with the building 1100. For example, as depicted, the cameras 142-1, 142-2, and the IoT device 163 for the second door 1104, are transmitting respective sensor data 1106-1, 1106-2, 1106-3 (e.g. interchangeably referred to hereafter as the sensor data 1106) to the workflow server 102 via respective gateways 141, 162. For example, the sensor data 1106-1 from the first camera 142-1 may comprise video and/or images that include the first door 1102 and/or an indication (e.g. generated via a respective VAE 143) that the first door 1102 is open or closed). The sensor data 1106-2 from the second camera 142-2 may comprise video and/or images that include the doors 1102, 1104 and/or respective indications (e.g. generated via a respective VAE 143) that the first door 1102 is open or closed, or that the second door 1104 is open or closed. For simplicity, hereafter, reference may be made to video or images of the cameras 142, but reference to "video" may be understood to include images, and similarly reference to "images" may be understood to include video.

The sensor data 1106-3 from the IoT device 163 may include an indication of whether the second door 1104 is open or closed. When the sensor data 1106 include indications as to whether the doors 1102, 1104 are open or closed, such indications may be generated and transmitted (and/or only generated and transmitted) when a respective door 1102, 1104 changes state from being open to being closed, or being closed to being opened; in other examples, such indications may be transmitted periodically. In examples where the sensor data 1106-1, 1106-2 include video and/or images of the doors 1102, 1104, such images of the doors 1102, 1104 may be streamed periodically and/or may comprise a live-stream, and/or such images of the doors 1102, 1104 may be transmitted (and/or only transmitted) when a respective door 1102, 1104 changes state from being open to being closed, or being closed to being opened.

Regardless, the workflow server 102 is understood to monitor workflows that may have been generated using the dashboard 800 and implement a workflow when the sensor data 1106 indicates that a respective trigger has occurred. Furthermore, the workflow server 102 may store the sensor data 1106, for example at the storage component 602, for example in association with respective times that the sensor data 1106 was generated and/or received. Indeed, in some examples, the sensor data 1106 may be time stamped, such that sensor data 1106 (e.g. such as video and/or images acquired by a camera 142 at a given time and/or within a given time period).

Figure 12:
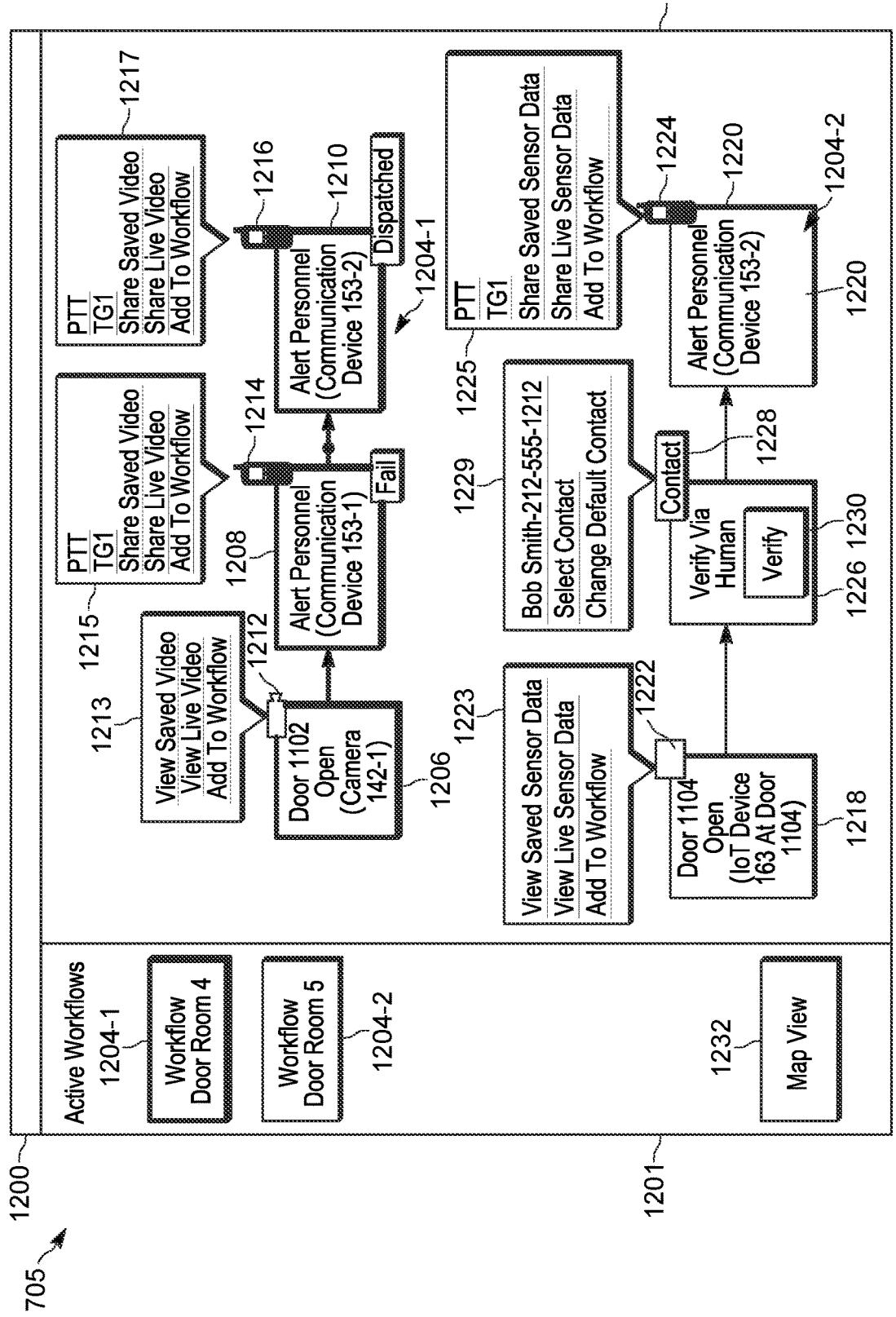
FIG. 12 depicts a dashboard for monitoring workflows according to a workflow view, in accordance with some examples.

For example, attention is next directed to FIG. 12 which depicts a dashboard 1200 to monitor workflows; the dashboard 1200 may be similar to the dashboard 800, but which has been adapted to include a selection panel 1201 and a workspace 1202. The selection panel 1201 is generally for selecting indications of previously generated security workflows 1204-1, 1204-2, which may be referred to hereafter, respectively, as a first workflow 1204-1 and a second workflow 1204, and/or interchangeably referred to, hereafter, collectively as the security workflows 1204 and/or, generically, as a security workflow 1204. In particular, as depicted, the selection panel 1201 may specifically show active workflows 1204, for example, workflows for which a trigger has occurred. For example, the first workflow 1204-1 may have been initiated when the first door 1102 to a room number 4 in the building 1100 was opened, and the second workflow 1204-1 may have been initiated when the second door 1104 to a room number 5 in the building 1100 was opened.

The workspace 1202 is generally to show indications of respective triggers and actions for the security workflows 1204-1, 1204-2. As such, the view of the dashboard 1200 depicted in FIG. 11 may be referred to as a workflow view and/or workflow mode of the dashboard 1200.

Hereafter, while it is understood that workflows, triggers and actions are components that may be implemented at the workflow server 102, and indications of workflows, triggers and actions depicted at the dashboard 1200 are visual indications of workflows, triggers and actions, for simplicity, hereafter, when discussing such indications with reference to the dashboard 1200, reference will be made to respective workflows, triggers and actions rather than indications thereof.

Furthermore, the security workflows 1204 may have been generated using the dashboard 800. In particular, the dashboards 800, 1200 may be components of a dashboard application being implemented by the workflow server 102 and/or the workstation 101, for example using Motorola Solution™'s Command Central™ software suite comprising the Orchestrate™ platform (e.g. at the workflow server 102) and/or the Motorola Solution™'s Orchestrate™ and Ally™ dispatch and incident management software (e.g. at the workstation 101). Indeed, the dashboard 800 may be to generate and edit workflows, while the dashboard 1200 may be to monitor and/or select workflows that have been provided to the workflow server 102, for example to show status of respective triggers and actions, as well as to edit workflows and/or interact with sensors and/or communication devices associated with workflows as described hereafter.

Furthermore, while the dashboard 1200 shows only two workflows 1204, any suitable number of workflows 1204 may be shown at the dashboard 1200. Furthermore, as other workflows 1204 become active, such active workflows 1204 may appear, for selection, at the selection panel 1201, and respective triggers and actions may appear at the workspace 1202 (e.g. as controlled by the workflow server 102); similarly, as other workflows 1204 become inactive, such inactive workflows 1204 may disappear from the selection panel 1201, and respective triggers and actions may disappear from the workspace 1202 (e.g. as controlled by the workflow server 102).

As depicted at the selection panel 1201, the first workflow 1204-1 has been selected for example using the input device 706. To show selection of the first workflow 1204-1, the first workflow 1204-1 is depicted in a heavier line than the second workflow 1204-2. Similarly, to show selection of the first workflow 1204-1, at the workspace 1202, a trigger and actions of the first workflow 1204-1 are depicted in heavier line than a trigger and actions of the second workflow 1204-2.

As depicted, the first workflow 1204-1 comprises a trigger 1206 of determining that the first door 1102 is open, specifically based on the sensor data 1106-1 from the first camera 142-1.

The first workflow 1204-1 further comprises an action 1208 of alerting personnel (e.g. a security guard) associated with the first communication device 153-1 when the trigger 1206 occurs; such an action 1208 may include the workflow server 102 automatically transmitting a dispatch command to the first communication device 153-1 when the trigger 1206 occurs (e.g. using an automated voice command and/or message in any suitable format), to dispatch personnel (e.g. a security guard) associated with the first communication device 153-1 to the first door 1102.

As depicted, the first workflow 1204-1 further comprises an action 1210 of alerting personnel (e.g. a security guard) associated with the second communication device 153-2 when the action 1208 fails to occur; the action 1210 may be similar to the action 1208 but a dispatch command may be transmitted to the second communication device 153-2 rather than the second communication device 153-2. Indeed, the first workflow 1204-1 further illustrates that a workflow may include a plurality of actions which may be provided in a cascading manner, and the like, such that, when a first action fails to occur and/or fails to execute, a second action may occur; such a failure may occur when the first communication device 153-1 fails to acknowledge the dispatch command (and the like), within a given time period (e.g. 1 minute, 2 minutes, and/or any other suitable time period).

Such conditional actions may be incorporated into a workflow via the dashboard 800 adapted to include such conditional actions in the selection panel 801 and/or the workspace 802 may be adapted to include components (e.g. which may be accessed via menus, pointers (e.g. a mouse), and the like), for making an action conditional.

The first workflow 1204-1, as depicted in the workspace 1202, furthermore visually indicates that the action 1210 occurs in response to the action 1208 failing; for example a line from the action 1208 to the action 1210 is of a different format than a line from the trigger 1206 to the action 1208 (e.g. the line from the action 1208 to the action 1210 includes a solid circle indicating that the action 1210 is conditional on the action 1208 failing).

As will be explained in more detail, as depicted in the workspace 1202, the trigger 1206 includes an electronic button 1212 which may be selected to view stored sensor data 1106-1 and/or live sensor data 1106-1, add the trigger 1206 to another workflow, and the like. As depicted, the electronic button 1212 is in a shape of a camera to indicate that the electronic button 1212 is for initiating processes associated with the first camera 142-1, as described hereafter.

For example, a menu 1213 associated with the electronic button 1212 is depicted, which may be provided at the display screen 705 when the electronic button 1212 is selected. The menu 1213 includes a list of selectable options which, when selected, may cause the workflow server 102 (and/or the workstation 101) to perform a respective process. |For example, as depicted, the menu 1213 includes a selectable option to "View Saved Video", which, when selected, may cause stored video (e.g. stored sensor data 1106-1 at the storage component 602) from the first camera 142-1 to be provided at the display screen 705 that included an event that caused the trigger 1206 to occur (e.g. the first door 1102 being opened). Furthermore, as depicted, the menu 1213 includes a selectable option to "View Live Video", which, when selected, may cause live video (e.g. sensor data 1106-1 currently being streamed) from the first camera 142-1 to be provided at the display screen 705. Furthermore, as depicted, the menu 1213 includes a selectable option to "Add To Workflow", which may enable the trigger 1206 to be added to another workflow, such as the second workflow 1204-1, or another, non-active workflow; selection of "Add To Workflow" may cause the dashboard 1200 to be at least temporarily replaced with the dashboard 800 for editing workflows.

Similarly, the action 1208 includes an electronic button 1214 which may be selected to contact the first communication device 153-1, transmit stored sensor data 1106-1 to the first communication device 153-12 (e.g. images showing the first door 1102 opened), transmit live sensor data 1106-1 to the first communication device 153-12, add the action 1208 to another workflow, and the like.

For example, a menu 1215 associated with the electronic button 1214 is depicted, which may be provided at the display screen 705 when the electronic button 1214 is selected. The menu 1215 includes a list of selectable options which, when selected, may cause the workflow server 102 (and/or the workstation 101) to perform a respective process. |For example, as depicted, the menu 1215 includes a selectable option "PTT" which, when selected, may cause a Push-To-Talk call to be initiated to the first communication device 153-1 for example from a further communication device associated with the user of the workstation 101 using, for example, the network interface 701 and any suitable combination of speakers and microphones at the workstation 101 (e.g. such as a headset worn by the user of the workstation 101); indeed the network interface 701 may generally represent a communication device associated with the user of the workstation 101. While such an example is described with respect to a PTT call, any suitable process for communicating with the first communication device 153-1 is within the scope of the present specification (e.g. a mobile and/or cellular phone call, and the like). As depicted, the menu 1215 includes a selectable option "TG1" which, when selected, may cause a group communications session to be initiated to a talkgroup "Talkgroup #1" of which the first communication device 153-1 may be a member, for example using a further communication device associated with the user of the workstation 101 such as the network interface 701.

As depicted, the menu 1215 further includes a selectable option to "Share Saved Video", which, when selected, may cause stored video (e.g. stored sensor data 1106-1) from the first camera 142-1 that included an event that caused the trigger 1206 to occur (e.g. the first door 1102 being opened) to be transmitted to the first communication device 153-1, for example by the workflow server 102. Furthermore, as depicted, the menu 1215 includes a selectable option to "Share Live Video", which, when selected, may cause live video (e.g. sensor data 1106-1 currently being streamed) from the first camera 142-1 to be streamed and/or transmitted to the first communication device 153-1, for example by the workflow server 102. Furthermore, as depicted, the menu 1215 includes a selectable option to "Add To Workflow", which may enable the action 1208 to be added to another workflow, such as the second workflow 1204-1, or another, non-active, workflow; selection of "Add To Workflow" may cause the dashboard 1200 to be at least temporarily replaced with the dashboard 800 for editing workflows.

As depicted, the action 1208 further includes a label "FAIL" which indicates that the action 1208 has failed; for example, the first communication device 153-1 may not have acknowledged the dispatch command, as described above, within a given time period. Such a label may further indicate that the action 1210 is being implemented in response to failure of the action 1208.

Similarly, the action 1210 includes an electronic button 1216 which may be selected to contact the second communication device 153-2, transmit stored sensor data 1106-1 to the second communication device 153-2 (e.g. images showing the first door 1102 opened), transmit live sensor data 1106-1 to the second communication device 153-2, add the action 1210 to another workflow, such as the second workflow 1204-1, and the like.

For example, a menu 1217 associated with the electronic button 1216 is depicted, which may be provided at the display screen 705 when the electronic button 1216 is selected. The menu 1217 includes a list of selectable options which, when selected, may cause the workflow server 102 (and/or the workstation 101) to perform a respective process. The menu 1217 is understood to be substantially similar to the menu 1215, however corresponding processes occur with respect to the second communication device 153-2, rather than the first communication device 153-1, or with respect to the action 1210, rather than the action 1208.

Furthermore, from the menu 1217, it is understood that the second communication device 153-2 is also a member of "Talkgroup #1".

As depicted, the action 1210 further includes a label "Dispatched" which indicates that personnel associated with the second communication device 153-2 has been dispatched to the location of the first door 1102. For example, the label "Dispatched" may be provided at the action 1210 in response to the second communication device 153-2 acknowledging a dispatch command (and the like), within a given time period.

The labels "Fail" and "Dispatched" of the actions 1208, 1210 may be dynamic however, and may be updated (e.g. by the workflow server 102) as status of the respective actions 1208, 1208. For example, the label "Dispatched" may have previously been "Waiting For Acknowledgement" and the like until the second communication device 153-2 acknowledged a dispatch command.

However, status of an action (and/or a trigger) may be visually provided in any suitable manner using, for example, different colors associated with different statuses and the like. For example, an action may be depicted as green when being implemented successfully, an action may be depicted as red when the action fails, or an action may be depicted as yellow when a status is being determined.

The second workflow 1204-2 may comprise a trigger 1218 of determining that the second door 1104 is open, specifically based on the sensor data 1106-3 from the IoT device 163 associated with the second door 1104. The second workflow 1204-2 further comprises an action 1220 of alerting personnel (e.g. a security guard) associated with the second communication device 153-2 when the trigger 1218 occurs, similar as described with respect to the actions 1208, 1210.

The trigger 1218 includes an electronic button 1222 that may be similar to the electronic button 1212, but in the shape of the IoT device 163 associated with the second door 1104, and may be used to view stored the sensor data 1106-3 that caused the trigger 1218 to occur (e.g. which may textually indicate that the second door 1104 was opened or closed and optionally a time that the second door 1104 opened or closed), view live sensor data 1106-3, and add the trigger 1218 to another workflow, such as the first workflow 1204-1, and the like.

For example, a menu 1223 associated with the electronic button 1222 is depicted, which may be provided at the display screen 705 when the electronic button 1222 is selected. The menu 1223 includes a list of selectable options which, when selected, may cause the workflow server 102 (and/or the workstation 101) to perform a respective process. The menu 1223 is understood to be substantially similar to the menu 1213, however corresponding processes occur with respect to the sensor data 1106-3 (e.g. IoT sensor data) rather than video. For example, selectable options to "View Saved Sensor Data" and "View Live Sensor Data", when selected, may respectively cause the workflow server 102 to provide stored sensor data 1106-3 and/or or live sensor data 1106-3 at the display screen 705 (e.g. textual indications of a stored or live status of whether the second door 1104 is opened or closed). When the stored sensor data 1106-3, the stored sensor data 1106-3 may be particular to when the IoT device 163 detected that the second door 1104 was opened, and a time that the second door 1104 was opened may also be provided at the display screen 705. Similarly, a selectable option "Add To Workflow" of the menu 1223 may be used to add the action 1220 to another workflow.

The action 1220 includes an electronic button 1224 that may be similar to the electronic button 1216 as described herein, but adapted for the second workflow 1204-1. For example, the electronic button 1224 may be used to initiate a call with the second communication device 153-2, and/or an associated talkgroup, transmit stored or live sensor data 1106-3 to the second communication device 153-2, and add the action 1220 to another workflow.

For example, a menu 1225 associated with the electronic button 1224 is depicted, which may be provided at the display screen 705 when the electronic button 1224 is selected. The menu 1217 includes a list of selectable options which, when selected, may cause the workflow server 102 (and/or the workstation 101) to perform a respective process. The menu 1225 is understood to be substantially similar to the menu 1217, however corresponding processes occur with respect to the sensor data 1106-3 (e.g. IoT sensor data) rather than video, and with respect to the action 1220 rather than the action 1210. For example, selectable options to "Share Saved Sensor Data" and "Share Live Sensor Data", when selected, may respectively cause the workflow server 102 to transmit stored or live sensor data 1106-3 to the second communication device 153-2. Similarly, a selectable option "Add To Workflow" may be used to add the action 1220 to another workflow.

As depicted, the second workflow 1204-2 further comprises a "human-in-the-loop" workflow component 1226 between the trigger 1218 and the action 1220. Such a "human-in-the-loop" workflow component 1226 may be incorporated into a workflow via the dashboard 800 adapted to include such "human-in-the-loop" workflow components in the selection panel 801. In particular, the "human-in-the-loop" workflow component 1226 comprises an action that occurs via a user of the workstation 101, and the like, contacting a given person (e.g. a human), who may be identified and/or contacted via an electronic button 1228 which, when actuated, may initiate a phone call, and the like, with a phone associated with the given person and/or which may enable providing the phone number of the given person and/or may enable a given person to be selected from a contact list and initiation of phone call with a phone of the given person.

For example, a menu 1229 associated with the electronic button 1228 is depicted, which may be provided at the display screen 705 when the electronic button 1228 is selected. The menu 1229 includes a list of selectable options which, when selected, may cause the workflow server 102 (and/or the workstation 101) to perform a respective process. For example, as depicted, the menu 1229 includes a selectable option "Bob Smith-212-555-1212", which, when selected, causes a call to be initiated to "Bob Smith" at the phone number "212-555-1212", from the workstation 101 (e.g. via the network interface 701, and the like), so that the user of the workstation 101 may verbally instruct "Bob Smith" to verify the trigger 1218. While this example is described with respect to a phone call, any other suitable type of communication for contacting a contact is within the scope of the present specification, including, but not limited to, an Internet Protocol (IP) based video call, texting, emails, messages, and the like.

In this example, it is understood that "Bob Smith" associated with the phone number "212-555-1212" is a default contact for the "human-in-the-loop" workflow component 1226. However, as depicted, the menu 1229 further comprises a selectable option to "Select Contact" which, while not depicted, may cause a contact list to be provided at the display screen 705 from which another contact may be selected.

Furthermore, as depicted, the menu 1229 further comprises a selectable option to "Change Default Contact" which, while not depicted, may cause a contact list to be provided at the display screen 705 from which a different contact may be selected as a default contact; in such examples, the selectable option "Bob Smith-212-555-1212" at the menu 1229 may be replaced with contact information of the different contact that was selected as the default contact. Alternatively, the selectable option to "Change Default Contact" may enable a different phone number, and the like, for the current default contact to be provided via the input device 706, and the like (e.g. a different phone number, email address, etc., for "Bob Smith").

While not depicted, the menu 1229 may further include a field for receiving a phone number via the input device 706 which may be used to initiate a call, and the like, to a user to verify the trigger 1218.

Regardless, the user of the workstation 101 may initiate a call and/or a communication session and/or a text session with a phone, and/or other communication device of the given person (e.g. using a telephone and/or other communication device, which may be separate from the workstation 101 and/or incorporated into the workstation 101). On the call, and the like, the user of the workstation 101 may ask that the given person verify that the second door 1104 is open (e.g. and/or verify that any real world components associated with a given trigger are in a state indicated by the given trigger and/or verify that a given trigger has actually occurred). The given person may walk to the second door 1104 and visually verify that the second door 1104 is open; the given person may then tell the user of the workstation 101 (e.g. via a call, message, and the like) that the second door 1104 is open; the user of the workstation 101 may operate the input device 706 to actuate an electronic button 1230 associated with the "human-in-the-loop" workflow component 1226, to initiate the action 1220.

As depicted, the electronic button 1230 includes text "Verify" indicating a current status of the "human-in-the-loop" workflow component 1226; specifically "Verify" generally indicates that the trigger 1218 has not yet been verified. However, when the electronic button 1230 is actuated, the text may change to "Verified" indicating that the trigger 1218 has been verified. Hence, as depicted, the text at the electronic button 1230 generally provides a status of the "human-in-the-loop" workflow component 1226, however the status of the "human-in-the-loop" workflow component 1226 may be provided in any suitable manner, for example as an indicator separate from the electronic button 1230.

Hence, the second workflow 1204-2 illustrates that a workflow as provided herein may include a "human-in-the-loop" workflow component, and that the dashboard 800 may be adapted accordingly.

In some examples, the depicted electronic buttons may only be selected for a selected active workflow. Hence, as depicted, as the first workflow 1204-1 is depicted as selected, the electronic buttons 1212, 1214, 1216 may be available for selection while the electronic buttons 1222, 1224, 1228 may not be available for selection. For example, while the electronic buttons 1222, 1224, 1228 may still be depicted when the associated second workflow 1204-2 is not selected, the electronic buttons 1222, 1224, 1228 may be grayed out and/or otherwise not actuatable (e.g. until the second workflow 1204-2 is selected). Such a scheme may prevent the electronic buttons 1222, 1224, 1228 from being accidentally actuated when a workflow, other than the second workflow 1204-2, is selected. However, in other examples, the electronic buttons 1222, 1224, 1228 may be actuatable regardless of which workflow 1204 is selected. Similar comments apply to the electronic buttons 1212, 1214, 1216 when a workflow 1204, other than the first workflow 1204-1, is selected. Regardless, a user may use the input device 706 to switch between the workflows 1204 via the selection panel 1201.

As depicted, the dashboard 1200 further includes an electronic button 1232 which, when actuated, causes the dashboard 1200 to switch to a map (e.g. and/or floorplan) view and/or a map mode. At FIG. 12, the dashboard 1200 includes an electronic button 1301, which, when actuated, causes the dashboard 1200 to switch back to the workflow view depicted in FIG. 11.

Figure 13:
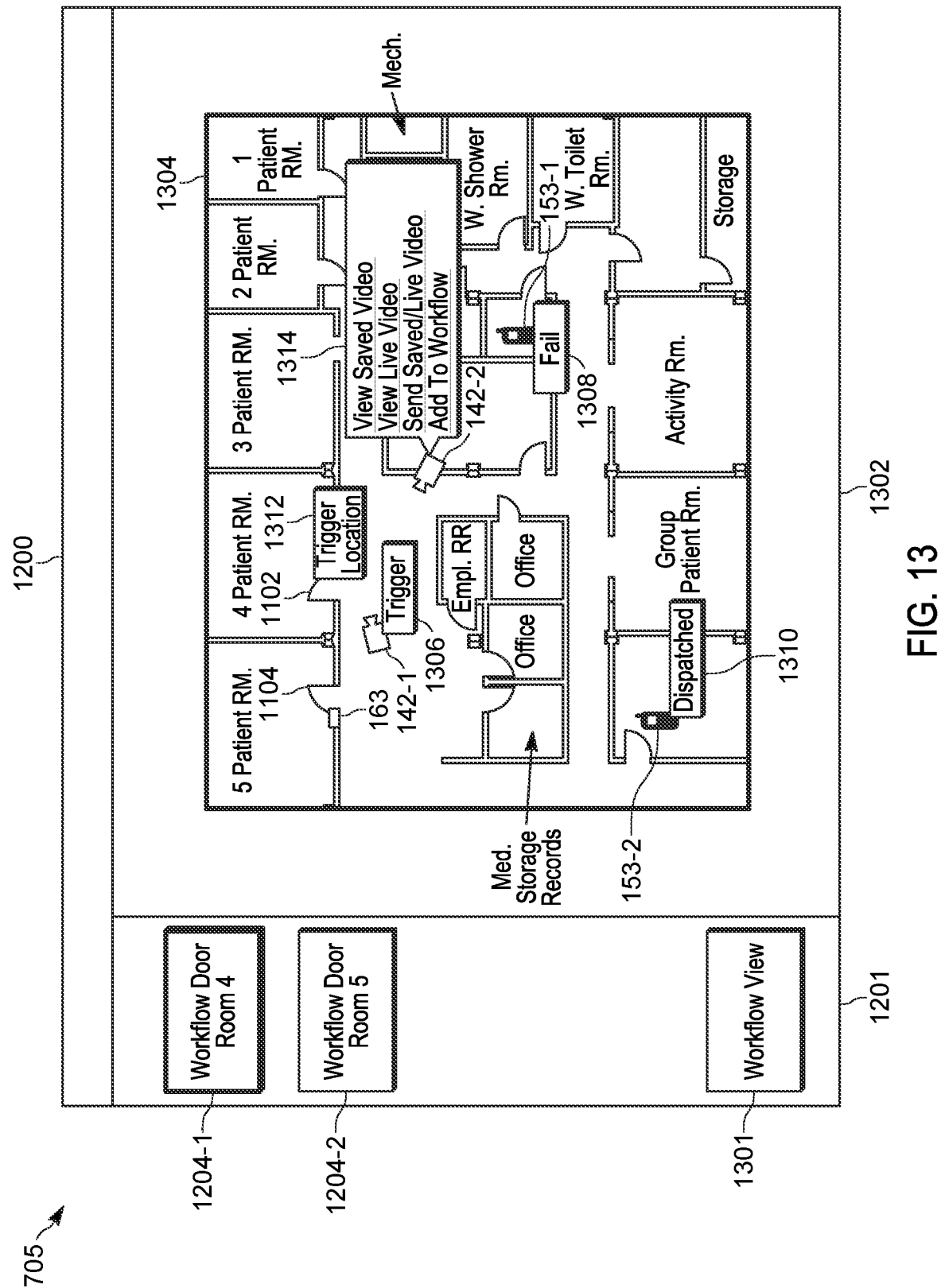
FIG. 13 depicts a dashboard for monitoring workflows according to a map and/or floorplan view, in accordance with some examples.

For example, attention is next directed to FIG. 13 which depicts another aspect of the dashboard 1200. In particular, FIG. 13 depicts the dashboard 1200 in a map view in which the workspace 1202 has been replaced with a map and/or floor plan-based workspace 1302 that shows one or more of a map 1304 and a floorplan of the building 1100 showing current locations of one or more physical sensors and one or more communication devices, for example associated with the active workflows 1204.

In particular, similar to FIG. 12, the first workflow 1204-1 is again shown as being selected.

For example, as depicted, the map 1304 shows icons at respective locations of the cameras 142, the IoT device 163 associated with the second door 1104 in the building 1100, and the communication devices 153, as well as respective locations of the doors 1102, 1104.

While the example of FIG. 13 shows the map 1304 as a floorplan of the building 1100, in other examples the map 1304 may be for an outdoor location, depending, for example, on locations of locations of the cameras 142, IoT devices 163, communication devices 137, 153, sensors 138, and the like.

While such icons (and the doors 1102, 1104) are indicated using reference numbers that are the same as the reference numbers of the cameras 142, the IoT device 163 and the communication devices 153 (and the doors 1102, 1104), such similar numbering is used only for simplicity and it is understood that the cameras 142, the IoT device 163 and the communication devices 153 are not physically part of the map 1304. Furthermore, the icons for the cameras 142 also show orientation of the cameras 142. For example, an icon for the first camera 142-1 comprises a picture of a camera with a lens thereof pointed at the first door 1102; similarly, an icon for the second camera 142-2 comprises a picture of a camera with a lens thereof pointed at the first door 1102 and the second door 1104.

The icon for the IoT device 163 is merely represented as a small box at the second door 1104, but may have any suitable format and/or configuration.

As depicted, the icons for the cameras 142 comprise respective pictures of respective types of the communication devices 153 (e.g. as depicted, respective picture a radio and/or a two-way radio). It is understood that locations of the icons for the cameras 142 may change at the map 1304 as the communication devices 153 move in the building 1100; as such, it is understood that the communication devices 153 may be reporting their respective locations (e.g. in the form of Global Positioning System (GPS) coordinates, and the like) to the workflow server 102, which updates the dashboard 1200 accordingly, and/or the building 1100 may comprise location determining devices (e.g. such as the cameras 142 and/or other cameras and/or a beaconing system) that determine respective locations of the communication devices 153 and report such respective locations the workflow server 102 which updates the dashboard 1200 accordingly.

In some examples, only icons for a selected workflow 1204 may be depicted. However, as depicted, for the selected first workflow 1204-1, indications of respective triggers and actions for the selected first workflow 1204-1 are depicted. For example, as depicted, the map 1304 further includes, at the icon for the first camera 142-1, an indication 1306 indicating that the sensor data 1106-1 from the first camera 142-1 caused the trigger 1206 to occur; while the indication 1306 comprises text "Trigger", the indication 1306 may include any suitable combination of text, graphics, colors and the like. Similarly, as depicted, the map 1304 further includes, at the icon for the first communication device 153-1, an indication 1308 indicating that the action 1208 failed; while the indication 1308 comprises text "Fail", the indication 1308 may include any suitable combination of text, graphics, colors, and the like indicating a status of the action 1208. Similarly, as depicted, the map 1304 further includes, at the icon for the second communication device 153-2, an indication 1310 indicating that the action 1210 is occurring in association with the second communication device 153-2, for example indicating that the second communication device 153-2 has been dispatched; while the indication 1310 comprises text "Dispatched", the indication 1310 may include any suitable combination of text, graphics, colors and the like indicating a status of the action 1210. The indications 1308, 1310, 1306 may be dynamic and may be updated (e.g. by the workflow server 102) as status of associated triggers and actions change.

As depicted, the map 1304 further shows an indication 1312 at a location of an event that may have caused the trigger 1206 of the selected first workflow 1204-1 to occur. For example, as depicted, the indication 1312 is located adjacent the first door 1102 and comprises text "Trigger Location", though the indication 1312 may include any suitable combination of text, graphics, and the like. Furthermore, the workflow server 102 may determine the location of an event that may have caused the trigger 1206 of the selected first workflow 1204-1 using a VAE 143 at the workflow server 102 and/or a VAE 143 of one or more of the cameras 142-1, 142-2 and/or any camera 142 may have the first door 1102 in a respective field-of-view.

In some examples, the icons for the cameras 142, the IoT device 163 associated with the second door 1104 in the building 1100, and the communication devices 153 may comprise electronic buttons similar to corresponding electronic buttons 1212, 1214, 1216, 1222, 1224 with similar functionality provided when actuated, for example with respective menus, similar to the menus shown in FIG. 11, being provided when actuated. For example, the icons for the cameras 142-1, 142-2 may comprise electronic buttons respectively similar to the electronic button 1212 which, when actuated, may cause respective menus to be provided similar to the menu 1213 (e.g. with a menu for the second camera 142-2 providing selectable options to access stored or live the sensor data 1106-2 and add another trigger to a workflow 1204, for example based on the sensor data 1106-2 from the second camera 142-2, and the like). Similarly, the icons for the communication devices 153-1, 153-2 may be respectively similar to the electronic buttons 1214, 1216.

In particular, as a camera 142, an IoT device 163 and/or a communication device 153 may be associated with more than one workflow 1204 (and/or an inactive workflow), it is understood that menus provided when a respective electronic button is actuated may be for a selected workflow 1204. Hence, as the first workflow 1204-1 is selected, the menus provided when a respective electronic button is actuated may be for the first workflow 1204-1.

However, in some examples, a camera 142, an IoT device 163 and/or a communication device 153 depicted at the map 1304 may not be associated with a workflow. For example, as described herein, the second camera 142-2 is not associated with a workflow; as such, when an icon for the second camera 142-2 is actuated, the corresponding menu 1314 is adapted accordingly. For example, as depicted, the menu 1314 includes a selectable option to "View Saved Video", which, when selected, may cause another menu to be provided to select a time period for which stored sensor data 1106-2 from the second camera 142-2 is to be provided at the display screen 705. For example, a user of the workstation 101 may select the selectable option to "View Saved Video" to review video of the first door 1102 in a time period in which the first door 1102 was detected to have been opened using the sensor data 1106-1 for the first camera 142-1. As depicted, the menu 1314 includes a selectable option to "View Live Video", which, when selected, may cause live sensor data 1106-2 from the second camera 142-2 to be provided at the display screen 705.

As depicted, the menu 1314 includes a selectable option to "Send Saved/Live Video", which, when selected, may cause another menu to be provided to select a time period for which stored sensor data 1106-2 from the second camera 142-2 is to be transmitted to a communication device 153, which may also be selected from such an another menu; such an another menu may also enable selection of a communication device 153 to which live video from the second camera 142-2 is transmitted.

As depicted, the menu 1314 includes a selectable option to "Add To Workflow", which, when selected, may cause another dashboard to be provided, such as the dashboard 800. for example to cause a trigger associated with the second camera 142-2 to be added to a workflow which may include, but is not limited to, a selected workflow 1204, such as the first workflow 1204-1, or another workflow. For example, a trigger similar to the trigger 1206 may be added to the first workflow 1204-1 such that, when sensor data 1106-1 from the second camera 142-2 indicates that the first door 1102 is opened, the action 1208, and/or the action 1210, occurs. Such a trigger may have been prepopulated at the dashboard 800, for example as a trigger 806, or such a trigger may be generated using any suitable process (e.g. a CNN of a VAE 143 associated with the second camera 142-2 may be configured to detect when the first door 1102 is opened or closed; in some examples such a configuration may occur based on CNN layers of a CNN of a VAE 143 associated with the first camera 142-1).

Figure 14:
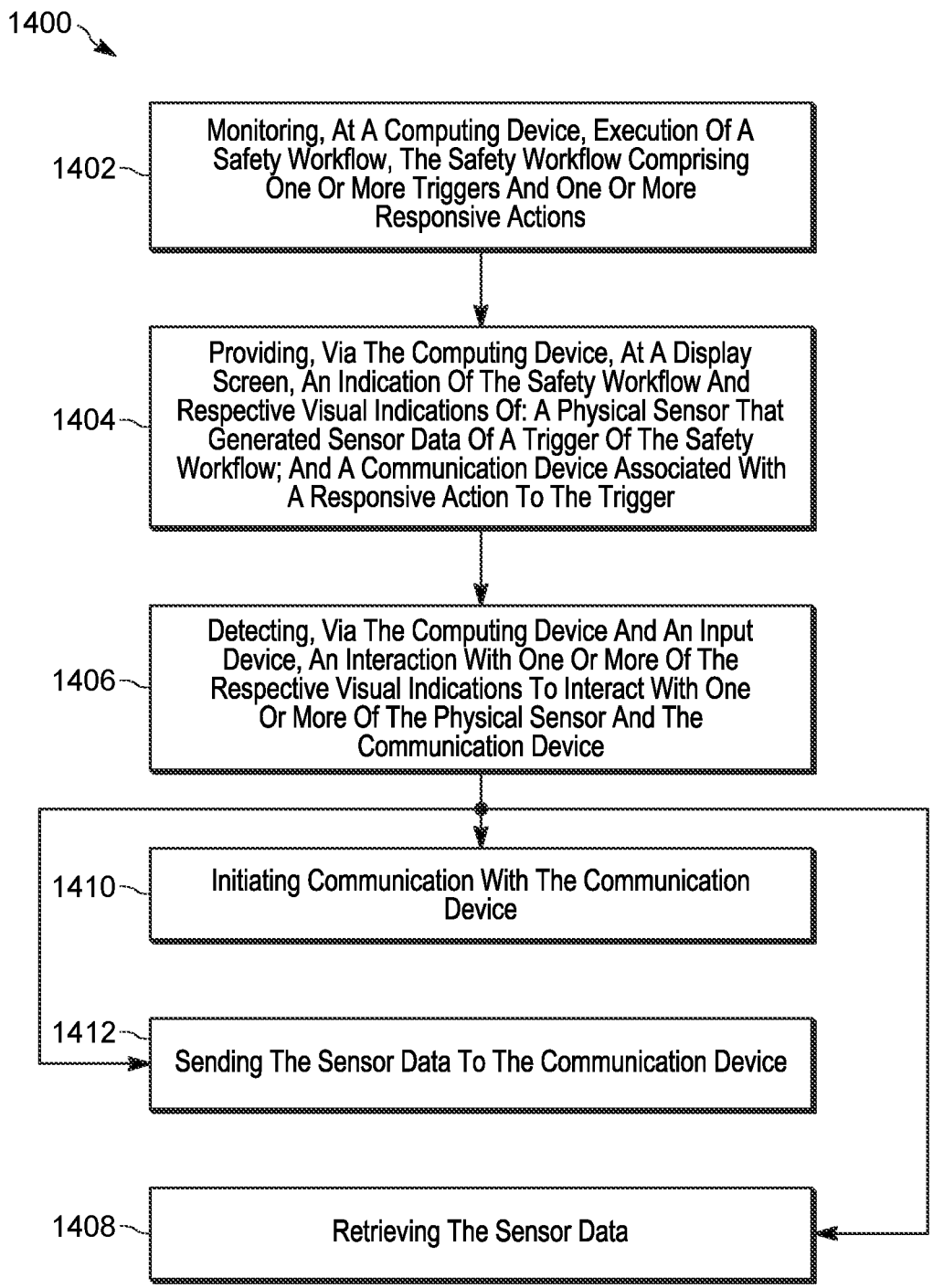
FIG. 14 depicts a flowchart of a method for communicating with communication devices based on workflow interactions, in accordance with some examples.

Attention is now directed to FIG. 14, which depicts a flowchart representative of a method 1400 for communicating with communication devices based on workflow interactions. The operations of the method 1400 of FIG. 14 correspond to machine readable instructions that are executed by the workflow server 102, and specifically the processor 603. In the illustrated example, the instructions are represented by the blocks of FIG. 14 and may be stored at the storage component 602. The method 1400 of FIG. 14 is one way that the processor 603 and/or the workflow server 102 and/or the system 100 may be configured. Furthermore, the following discussion of the method 1400 of FIG. 14 will lead to a further understanding of the system 100, and its various components.

The method 1400 of FIG. 14 need not be performed in the exact sequence as shown and likewise various blocks may be performed in parallel rather than in sequence. Accordingly, the elements of method 1400 are referred to herein as "blocks" rather than "steps." The method 1400 of FIG. 14 may be implemented on variations of the system 100 of FIG. 1, as well.

Furthermore, some aspects of the method 1400 may correspond to machine readable instructions that are executed by the workstation 101, and specifically the processor 703, for example in conjunction with the workflow server 102. For example, in the description of the method 1400, reference will be made to providing certain components at the display screen 705; while the workstation 101 may control the display screen 705 to render such components, the workflow server 102 may provide such components to the workstation 101 to cause the workflow server 102 to render such components. Hence, the workflow server 102 may provide such components via the display screen 705 of the workstation 101, though the workflow server 102 may provide such components remotely from the display screen 705.

At a block 1402, the processor 603 and/or the workflow server 102 (e.g. and/or any other suitable computing device) monitors execution of a safety workflow 1204, the safety workflow 1204 comprising one or more triggers and one or more responsive actions, as described above.

In particular, the one or more triggers may be based on respective sensor data from one or more physical sensors, such as the sensors 138, the cameras 142, the IoT devices 163, and the like, and the one or more responsive actions may be implemented via one or more communication devices, such as the communication devices 137, 153.

For example, hereafter the method 1400 will be described with reference to monitoring the first workflow 1204-1, though, at the block 1402, the processor 603 and/or the workflow server 102 (e.g. and/or any other suitable computing device) may monitor any suitable number of workflows 1204.

Hence, using the first workflow 1204-1, the trigger 1206 and the actions 1208, 1210 as an example, at a block 1404, the processor 603 and/or the workflow server 102 (e.g. and/or any other suitable computing device) provides, at the display screen 705, an indication of the safety workflow 1204-1 (e.g. a selected workflow) and respective visual indications of: a physical sensor (e.g. the first camera 142-1) that generated sensor data (e.g. the sensor data 1106-1) of a trigger 1206 of the safety workflow 1204-1; and a communication device 153-1, 153-2 associated with a responsive action 1208, 1210 to the trigger 1206.

In some examples, the indication of the safety workflow 1204-1 of the block 1404 may comprise a visual representation of the safety workflow 1204-1 itself, for example as depicted in FIG. 12. In these examples, the respective visual indications (e.g. of a physical sensor that generated sensor data of the trigger 1206 of the safety workflow 1204-1 and a communication device 153-1, 153-2 associated with a responsive action 1208, 1210 to the trigger 1206) may be provided on the visual representation of the safety workflow 1204-1 itself. For example, again with reference to FIG. 12, the respective visual indication of the physical sensor that generated sensor data of the trigger 1206 of the safety workflow 1204-1 may comprise the electronic button 1212 which, as depicted, is in the form of an icon of a camera, and which, when actuated, may enable processes associated with the first camera 142-1 via the menu 1213.

Similarly, again with reference to FIG. 12, the respective visual indication of a communication device 153-1, 153-2 associated with a responsive action 1208, 1210 to the trigger 1206 may comprise the electronic buttons 1214, 1216 which, as depicted, are in the form of icons representing respective types of the communication devices 153-1, 153-2, and which, when respectively actuated, may enable processes respectively associated with the communication devices 153-1, 153-2, for example via the menus 1215, 1217.

In other examples, the indication of the safety workflow 1204-1 may comprise one or more of the map 1304 and a floorplan showing current locations of the one or more physical sensors (e.g. the cameras 142-1, 142-2 and the IoT device 163 associated with the second door 1104) and the one or more communication devices 153-1, and the respective visual indications may be located at one or more of the map 1304 and the floorplan and show respective current locations of the physical sensor and the communication device(s) associated with the safety workflow 1204-1. Hence, in some examples, with reference to FIG. 13, the respective visual indications of a physical sensor and a communication device 153 of the block 1404 may comprise the map 1304 in combination with the indications 1306, 1308, 1310, and in further combination with respective icons for the first camera 142-1 and the communication devices 153-1, 153-2, as well as respective menus (e.g. similar to the menus 1213, 1215, 1217, the menu 1314, and the like).

At a block 1406, the processor 603 and/or the workflow server 102 (e.g. and/or any other suitable computing device) detects, via the input device 706, an interaction with one or more of the respective visual indications to interact with one or more of the physical sensor (e.g. the first camera 142-1) and the communication device (e.g. one or more of the communication devices 153-1, 153-2).

For example, at the example of FIG. 12, the electronic buttons 1212, 1214, 1216 may be actuated to cause a respective menu 1213, 1215, 1217 to be provided at the display screen 705 from which certain processes may be selected for implementation, as previously described. Alternatively, at the example of FIG. 13, electronic buttons of the various icons depicted may be actuated to cause a respective menu to be provided at the display screen 705 from which certain processes may be selected for implementation, as previously described.

Based on the interaction of the block 1406, the processor 603 and/or the workflow server 102 (e.g. and/or any other suitable computing device), may, at a block 1408, retrieve (e.g., via the network interface 601) the sensor data 1106-1 (e.g. that cause the trigger 1206 to occur). For example, the interaction of the block 1406 may comprise selecting the selectable option "View Saved Video", and/or the selectable option "View Live Video" of the menu 1213 to retrieve the sensor data 1106-1, or receive live sensor data 1106-1. In particular, when the selectable option "View Saved Video" is selected, video and/or images of the sensor data 1106-1 may be retrieved from the storage component 602 and may be provided at the display screen 705, for example in a window at, and/or on, the dashboard 1200.

Alternatively, and/or in addition based on the interaction of the block 1406, the processor 603 and/or the workflow server 102 (e.g. and/or any other suitable computing device), may, at a block 1410, initiate (e.g., via the network interface 601) communication with a communication device 153-1, 153-2 of one of the actions 1208, 1210. For example, the interaction of the block 1406 may comprise selecting the selectable option "PTT" of the menu 1215, or the menu 1217" to initiate a call with a respective communication device 153-1, 153-2.

In some examples, a communication device 153 with which communications may be initiated at the block 1410, may be one of a group of associated communications devices 153; for example, the communication devices 153-1, 153-2 may be members of a talkgroup. In these examples, the method 1400 may further comprise initiating a communications session between the group of associated communications devices 153 and a further communication device associated with a user associated with the computing device, for example, the user of the workstation 101.

Alternatively, and/or in addition based on the interaction of the block 1406, the processor 603 and/or the workflow server 102 (e.g. and/or any other suitable computing device), may, at a block 412, send (e.g., via the network interface 601) the sensor data 1106-1 to a communication device 153-1, 153-2 of one of the actions 1208, 1210. For example, the interaction of the block 1406 may comprise selecting the electronic button 1214 or the electronic button 1216, to sending the sensor data 1106-1 to a respective communication device 153-1, 153-2. For example, the interaction of the block 1406 may comprise selecting the selectable option "TG1" of the menu 1215, or the menu 1217" to initiate a call with a respective talkgroup which may include one or more of the communication devices 153-1, 153-2.

Alternatively, and/or in addition based on the interaction of the block 1406, the processor 603 and/or the workflow server 102 (e.g. and/or any other suitable computing device), may, at a block 1412, send sensor data 1106 to a communication device 153-1, 153-2 of one of the actions 1208, 1210. For example, the interaction of the block 1406 may comprise selecting the selectable option "Share Saved Video" and or selecting the selectable option "Share Live Video" of the menu 1215, or the menu 1217" to respectively transmit stored sensor data 1106-1 or live sensor data sensor data 1106-1 to a respective communication device 153-1, 153-2.

Hence, it is understood that the method 200 may comprise the processor 603 and/or the workflow server 102 (e.g. and/or any other suitable computing device) based on the interaction of the block 1406, one or more of (e.g. in any suitable combination): retrieving sensor data 1106; initiating communication with a communication device 153; and sending the sensor data 1106 to the communication device 153.

The method 1400 may include any other suitable features.

For example, the method 1400 may further comprise the processor 603 and/or the workflow server 102 (e.g. and/or any other suitable computing device) detecting, via the input device 706, a selection of a further safety workflow; and updating the display screen 705 to show a respective indication of the further safety workflow and respective further visual indications of a further physical sensor and a further communication device 153 associated with a respective trigger and a respective action of the further safety workflow.

For example, with reference to FIG. 12, when the second safety workflow 1204-2 is selected at the selection panel 1201, the associated trigger 1218, action 1220 and "human-in-the-loop" workflow component 1226 may be highlighted, with associated visual indications of the IoT device 163 and the second communication device 153-2 in the form of the electronic buttons 1222, 1224 being made available for selection.

Similarly, with reference to FIG. 13, when the second safety workflow 1204-2 is selected at the selection panel 1201, indications similar to the indications 1306, 1310, 1312 may be respectively located at icons for the IoT device 163, the second communication device 153-2 and at a location of the second door 1104. When the "human-in-the-loop" workflow component 1226 has not yet been used to verify the trigger 1218, an indication at the second communication device 153-2 may indicate "Waiting For Verification Before Dispatching" and the like, and change to "Dispatched" once the "human-in-the-loop" workflow component 1226 has been used to verify the trigger 1218, and/or be visually changed in any suitable manner (e.g. using different colors for different statuses).

The method 1400 may further comprise the processor 603 and/or the workflow server 102 (e.g. and/or any other suitable computing device) providing, at the display screen, 705 a respective indication of a further sensor, not currently involved in the execution of the safety workflow 1204-1; detecting, via the input device 706, an input to add a further trigger to the safety workflow 1204-1 based on the further sensor; and responsive to detecting the input, modifying the safety workflow 1204-1 to include the further trigger for future executions of the safety workflow 1204-1.

For example, as described above with respect to FIG. 13, it is understood that the second camera 142-2 is not currently involved in the execution of the safety workflow 1204-1. However, the selectable option "Add To Workflow" of the menu 1314 may be used to add a trigger associated with the second camera 142-2 to the first workflow 1204-1 (e.g. such that the action 1208 and/or the action 1210 occurs when the sensor data 1106-2 is used to detect that the first door 1102 is open).

The method 1400 may further comprise the processor 603 and/or the workflow server 102 (e.g. and/or any other suitable computing device) providing, at the display screen 705, a respective indication of a further communication device, not currently involved in the execution of a safety workflow 1204; detecting, via the input device 706, an input to add a further responsive action to the safety workflow 1204 based on the further communication device; and responsive to detecting the input, modifying the safety workflow 1204 to include the further responsive action for future executions of the safety workflow 1204.

For example, as described above with respect to FIG. 12, it is understood that the first communication device 153-1 is not currently involved in the execution of the safety workflow 1204-1. However, the selectable option "Add To Workflow" of the menu 1215 may be used to add an action (e.g. similar to the action 1208) associated with the first communication device 153-1 to the second workflow 1204-2.

Furthermore, as has already been described, the selectable options "Add To Workflow" at the menus 1215, 1217, 1225, and the like, may be used to add an action associated with a respective communication device 153 to a safety workflow. While the examples provided herein have been described with respect to only two communication devices 153, both of which are components of the safety workflow 1204-1, when electronic buttons for other communication devices 137, 153 are in the building 1100, and/or shown on the map 1304 (e.g. in the form of icons), such electronic buttons, when selected, may cause a menu similar to the menus 1215, 1217, 1225 to be provided, but with a selectable option of "Add To Workflow" included that enables adding an action for a corresponding communication device 137, 153 to a workflow, similar to as described with respect to the selectable option "Add To Workflow" of the menu 1314.

The method 1400 may further comprise the processor 603 and/or the workflow server 102 (e.g. and/or any other suitable computing device) providing, at the display screen 705, a further respective visual indications of: a "human-in-the-loop" workflow component 1226 of a safety workflow 1204; and a current status of the "human-in-the-loop" workflow component 1226; providing, at the display screen 705, options for modifying parameters of the "human-in-the-loop" workflow component 1226 including one or more of: an identity of a person to be contacted to verify the trigger; and contact information for contacting the person; and responsive to receiving, via the input device 706, a modification to the parameters, modifying the safety workflow 1204 to include modified parameters of the "human-in-the-loop" workflow component 1226 for future executions of the safety workflow 1204.

For example, with reference to FIG. 12, the workspace 1202 generally provides a visual indication of the "human-in-the-loop" workflow component 1226 and a current status of the "human-in-the-loop" workflow component 1226 in the form of the text at the electronic button 1230.

Furthermore, the menu 1229 generally provides selectable options for modifying parameters of the "human-in-the-loop" workflow component 1226 including modifying the identity of a person to be contacted to verify the trigger 1218; and contact information for contacting the person. For example, the selectable options "Select Contact" and/or "Change Default Contact" may be used to change the person to be contacted to verify the trigger 1218 and/or an associated phone number, and the like.

Figure 15:
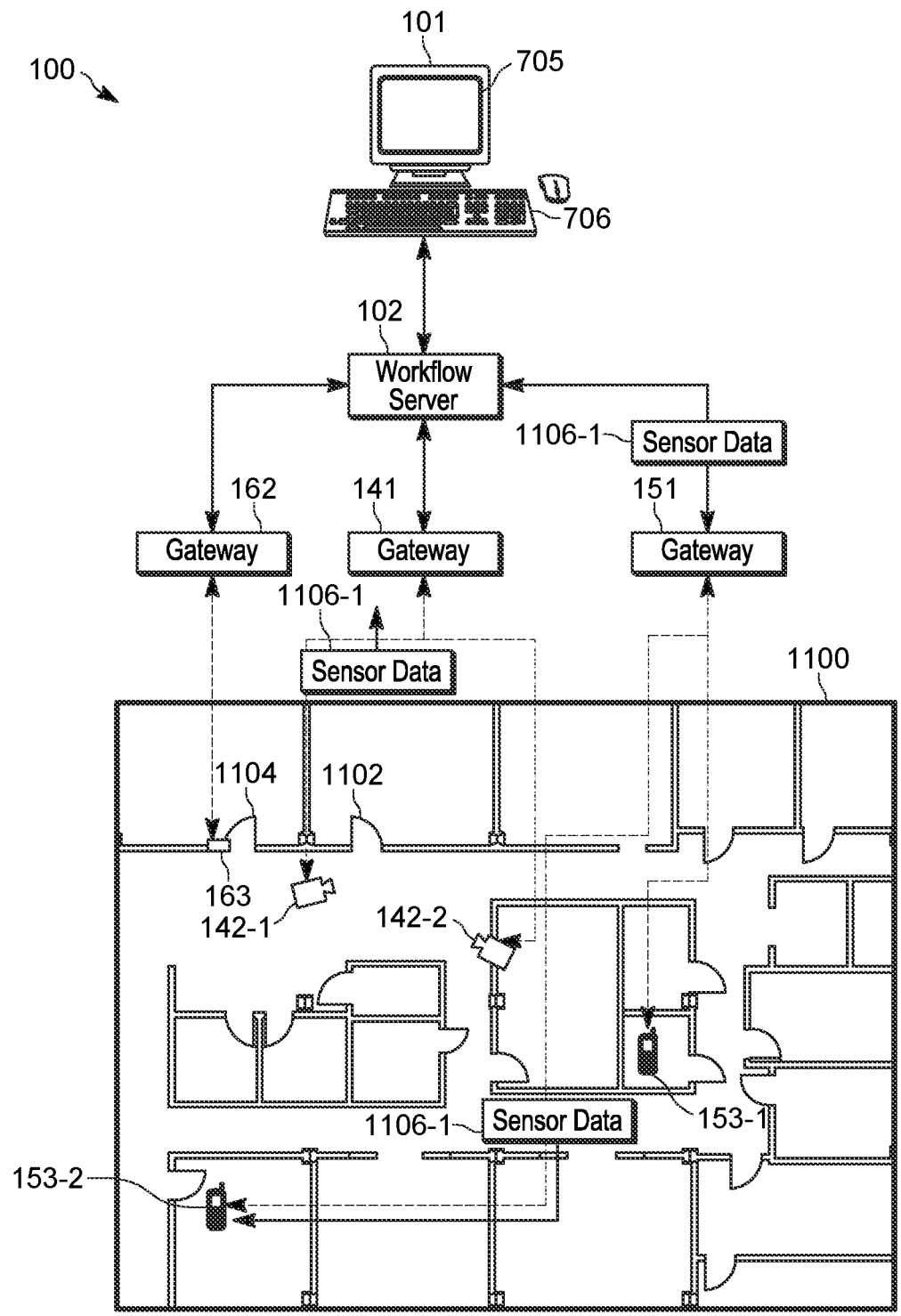
FIG. 15 depicts the system as shown in FIG. 15 at least partially implementing aspects of a method for communicating with communication devices based on workflow interactions, in accordance with some examples.

Attention is next directed to FIG. 15 which depicts processes that may occur in the system 100 when the selectable option of "Share Saved Video" and/or the selectable option of "Share Live Video" are selected from the menu 1217. FIG. 15 is substantially similar to FIG. 11 with like components having like numbers.

In particular, as depicted, when the selectable option of "Share Saved Video" and/or the selectable option of "Share Live Video" are selected from the menu 1217, the sensor data 1106-1 from the first camera 142-1 may be retrieved from the storage component 602 and transmitted to the second communication device 153-2 and/or live sensor data 1106-1 from the first camera 142-1 may be transmitted to the second communication device 153-2. Regardless, FIG. 15 provides an example of at least the blocks 1408, 1412 of the method 1400.

Figure 16:
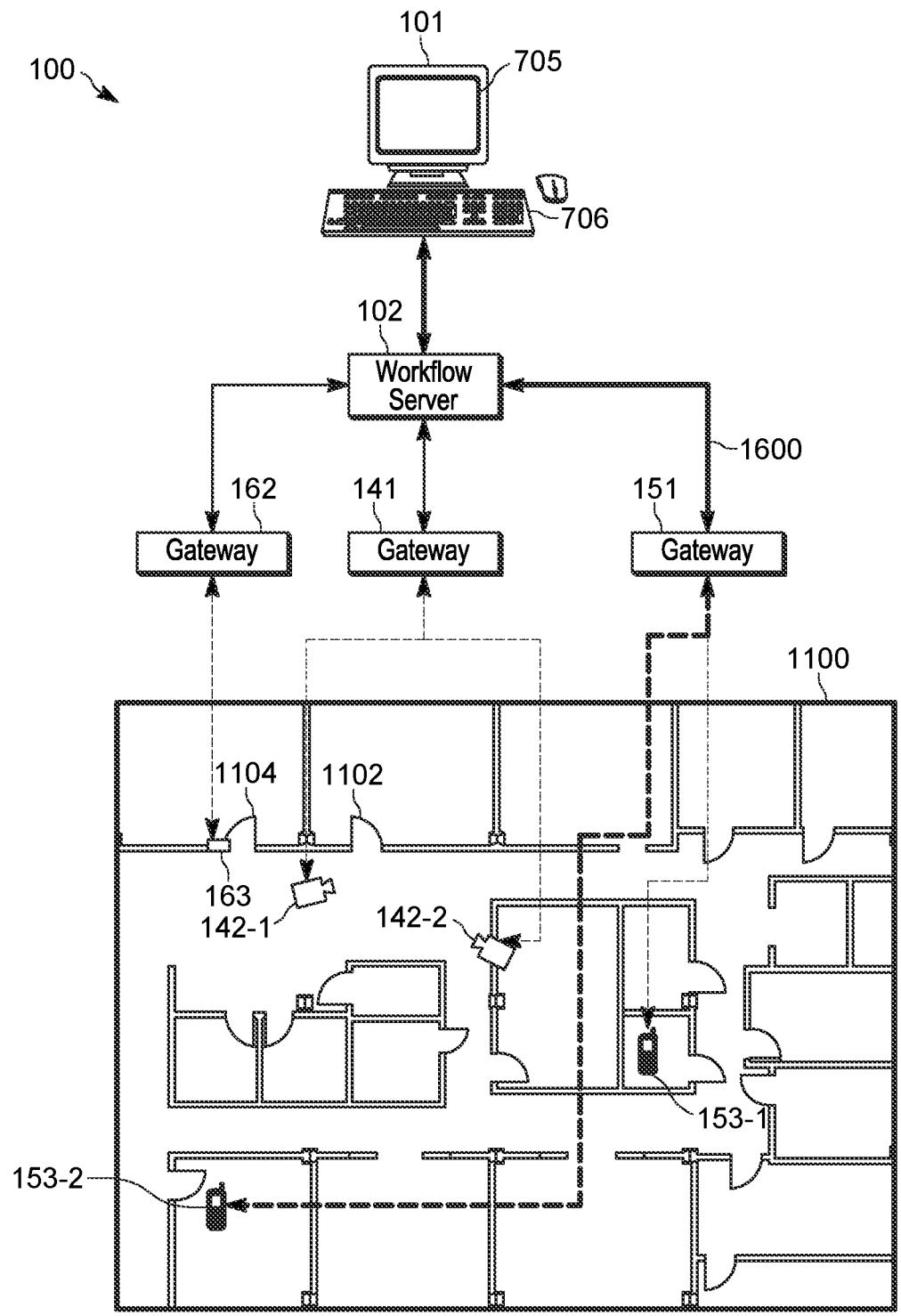
FIG. 16 depicts the system as shown in FIG. 15 at least partially implementing other aspects of a method for communicating with communication devices based on workflow interactions, in accordance with some examples.

Attention is next directed to FIG. 16 which depicts processes that may occur in the system 100 when the selectable option of "PTT" is selected from the menu 1217. FIG. 16 is substantially similar to FIG. 11 with like components having like numbers.

In particular, as depicted, when the selectable option of "PTT" is selected from the menu 1217, the workflow server 102 initiates a call 1600 between the workstation 101 and the second communication device 153-2, as represented in FIG. 16 by way of double-ended arrows indicating communication links between the workstation 101, the workflow server 102, the gateway 151 and the second communication device 153-2 being heavier than double-ended arrows of other communication links. Regardless, FIG. 16 provides an example of at least the block 1408, 1410 of the method 1400.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, implement electronic workflows, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    monitoring, at a computing device, execution of a safety workflow, the safety workflow comprising one or more triggers and one or more responsive actions;
    providing, via the computing device, at a display screen, an indication of the safety workflow and respective visual indications of:
        a physical sensor that generated sensor data of a trigger of the safety workflow; and
        a communication device associated with a responsive action to the trigger;
    detecting, via the computing device and an input device, an interaction with one or more of the respective visual indications to interact with one or more of the physical sensor and the communication device;
    based on the interaction, one or more of:
        retrieving the sensor data;
        initiating communication with the communication device; and
        sending the sensor data to the communication device;
    providing, at the display screen, further respective visual indications of: a human-in-the-loop workflow component of the safety workflow; and a current status of the human-in-the-loop workflow component;
    providing, at the display screen, options for modifying parameters of the human-in-the-loop workflow component including one or more of: an identity of a person to be contacted to verify the trigger; and contact information for contacting the person; and
    responsive to receiving, via the input device, a modification to the parameters, modifying the safety workflow to include modified parameters of the human-in-the-loop workflow component for future executions of the safety workflow.

2. The method of claim 1, wherein the one or more triggers are based on respective sensor data from one or more physical sensors, and the one or more responsive actions are implemented via one or more communication devices.

3. The method of claim 1, further comprising:
    providing, via the computing device, at the display screen, the indication of the safety workflow and yet further respective indications of:
        a further sensor that generated respective sensor data of a further trigger of the safety workflow; and
        a further communication device associated with a further responsive action to the further trigger.

4. The method of claim 1, further comprising:
    providing, at the display screen, a respective indication of a further sensor, not currently involved in the execution of the safety workflow;
    detecting, via the input device, an input to add a further trigger to the safety workflow based on the further sensor; and
    responsive to detecting the input, modifying the safety workflow to include the further trigger for the future executions of the safety workflow.

5. The method of claim 1, further comprising:
    providing, at the display screen, a respective indication of a further communication device, not currently involved in the execution of the safety workflow;
    detecting, via the input device, an input to add a further responsive action to the safety workflow based on the further communication device; and
    responsive to detecting the input, modifying the safety workflow to include the further responsive action for the future executions of the safety workflow.

6. The method of claim 1, wherein the indication of the safety workflow comprises a visual representation of the safety workflow itself, and the respective visual indications are provided on the visual representation of the safety workflow itself.

7. The method of claim 1, wherein the indication of the safety workflow comprises a workflow view and a map view, and the method further comprises:
    switching between the workflow view and the map view during execution of the safety workflow.

8. The method of claim 1, wherein the communications device is one of a group of associated communications devices, the method further comprising:
    initiating a communications session between the group of associated communications devices and a further communication device associated with a user associated with the computing device.

9. The method of claim 1, wherein the initiating communication with the communication device comprises one or more of: initiating a call with the communication device; initiating a communication session with the communication device; and initiating a text session with the communication device.

10. A device comprising:
    a network interface; and a processor configured to:
    monitor execution of a safety workflow, the safety workflow comprising one or more triggers and one or more responsive actions;
    provide, at a display screen, an indication of the safety workflow and respective visual indications of:
        a physical sensor that generated sensor data of a trigger of the safety workflow; and
        a communication device associated with a responsive action to the trigger;
    detect, via an input device, an interaction with one or more of the respective visual indications to interact with one or more of the physical sensor and the communication device;
    based on the interaction, one or more of:
        retrieving, via the network interface, the sensor data;
        initiating, via the network interface, communication with the communication device; and
        sending, via the network interface, the sensor data to the communication device;

provide, at the display screen, further respective visual indications of: a human-in-the-loop workflow component of the safety workflow; and a current status of the human-in-the-loop workflow component;

provide, at the display screen, options for modifying parameters of the human-in-the-loop workflow component including one or more of: an identity of a person to be contacted to verify the trigger; and contact information for contacting the person; and responsive to receiving, via the input device, a modification to the parameters, modify the safety workflow to include modified parameters of the human-in-the-loop workflow component for future executions of the safety workflow.

11. The device of claim 10, wherein the one or more triggers are based on respective sensor data from one or more physical sensors, and the one or more responsive actions are implemented via one or more communication devices.

12. The device of claim 10, wherein the processor is further configured to:

provide, at the display screen, the indication of the safety workflow and yet further respective visual indications of:

a further physical sensor that generated respective sensor data of a further trigger of the safety workflow; and a different communication device associated with a further responsive action to the further trigger.

13. The device of claim 10, wherein the processor is further configured to:

provide, at the display screen, a respective indication of a further sensor, not currently involved in the execution of the safety workflow;

detect, via the input device, an input to add a further trigger to the safety workflow based on the further sensor; and responsive to detecting the input, modify the safety workflow to include the further trigger for the future executions of the safety workflow.

14. The device of claim 10, wherein the processor is further configured to:

provide, at the display screen, a respective indication of a further communication device, not currently involved in the execution of the safety workflow;

detect, via the input device, an input to add a further responsive action to the safety workflow based on the further communication device; and responsive to detecting the input, modify the safety workflow to include the further responsive action for the future executions of the safety workflow.

15. The device of claim 10, wherein the indication of the safety workflow comprises a workflow view and a map view, and the processor is further configured to:

switch between the workflow view and the map view during execution of the safety workflow.

16. The device of claim 10, wherein the communications device is one of a group of associated communications devices, and the processor is further configured to:

initiate a communications session between the group of associated communications devices and a further communication device associated with a user associated with the computing device.

17. The device of claim 10, wherein the processor is further configured to initiate communication with the communication device by one or more of: initiating a call with the communication device; initiating a communication session with the communication device; and initiating a text session with the communication device.

18. A method comprising:

monitoring, at a computing device, execution of a safety workflow, the safety workflow comprising one or more triggers and one or more responsive actions;

providing, via the computing device, at a display screen, an indication of the safety workflow and respective visual indications of:

a physical sensor that generated sensor data of a trigger of the safety workflow; and a communication device associated with a responsive action to the trigger;

detecting, via the computing device and an input device, an interaction with one or more of the respective visual indications to interact with one or more of the physical sensor and the communication device; and based on the interaction, one or more of:

retrieving the sensor data;

initiating communication with the communication device; and sending the sensor data to the communication device, wherein the indication of the safety workflow comprises a workflow view and a map view, and the method further comprises: switching between the workflow view and the map view during execution of the safety workflow.

19. A device comprising:

a network interface; and a processor configured to:

monitor execution of a safety workflow, the safety workflow comprising one or more triggers and one or more responsive actions;

provide, at a display screen, an indication of the safety workflow and respective visual indications of:

a physical sensor that generated sensor data of a trigger of the safety workflow; and a communication device associated with a responsive action to the trigger;

detect, via an input device, an interaction with one or more of the respective visual indications to interact with one or more of the physical sensor and the communication device; and based on the interaction, one or more of:

retrieving, via the network interface, the sensor data;

initiating, via the network interface, communication with the communication device; and sending, via the network interface, the sensor data to the communication device, wherein the indication of the safety workflow comprises a workflow view and a map view, and the processor is further configured to: switch between the workflow view and the map view during execution of the safety workflow.

* * * * *